United States Patent
Kiederle et al.

(10) Patent No.: US 9,662,516 B2
(45) Date of Patent: *May 30, 2017

(54) LAMINAR STRUCTURE PROVIDING ADAPTIVE THERMAL INSULATION

(75) Inventors: Guenter Kiederle, Feldkirchen/Westerham (DE); Stefan Hauer, Bad Wiessee (DE); Helga Baumgaertler, Hohenlinden (DE); Reiner Kasemann, Ottobrunn (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 816 days.

This patent is subject to a terminal disclaimer.

(21) Appl. No.: 13/980,967

(22) PCT Filed: Jan. 28, 2011

(86) PCT No.: PCT/EP2011/051263
§ 371 (c)(1),
(2), (4) Date: Sep. 19, 2013

(87) PCT Pub. No.: WO2012/100839
PCT Pub. Date: Aug. 2, 2012

(65) Prior Publication Data
US 2014/0030468 A1 Jan. 30, 2014

(51) Int. Cl.
*B29D 22/00* (2006.01)
*A62B 17/00* (2006.01)
(Continued)

(52) U.S. Cl.
CPC ........ *A62B 17/003* (2013.01); *A41D 31/0027* (2013.01); *B32B 5/26* (2013.01); *Y10T 428/231* (2015.01)

(58) Field of Classification Search
CPC .... A41D 31/0027; A62B 17/003; B32B 3/28; B32B 3/30; B32B 5/26; Y10T 428/1334
(Continued)

(56) References Cited

U.S. PATENT DOCUMENTS

| 3,953,566 | A | 4/1976 | Gore |
| 4,187,390 | A | 2/1980 | Gore |
| 4,194,041 | A | 3/1980 | Gore et al. |
| 4,493,870 | A | 1/1985 | Vrouenraets et al. |
| 4,945,015 | A | 7/1990 | Milner et al. |
| 5,468,537 | A | 11/1995 | Brown et al. |
| 6,261,678 | B1 | 7/2001 | Von Fragstein et al. |
| 7,396,784 | B2* | 7/2008 | Thiriot ............... A41D 31/0022 428/920 |
| 2003/0004247 | A1* | 1/2003 | Destandau ............... B32B 1/06 524/437 |
| 2005/0009429 | A1 | 1/2005 | Park et al. |
| 2005/0050619 | A1 | 3/2005 | Dunn |
| 2008/0282455 | A1* | 11/2008 | Jones ................... A62B 17/003 2/458 |

(Continued)

FOREIGN PATENT DOCUMENTS

| CN | 101802131 | 8/2010 |
| CN | 101903173 | 12/2010 |

(Continued)

OTHER PUBLICATIONS

Japanese Office Action mailed on Aug. 25, 2015 for JP Patent Application No. 2013-550771, with English translation, 8 pages.

(Continued)

*Primary Examiner* — James Yager
(74) *Attorney, Agent, or Firm* — Kilpatrick Townsend & Stockton, LLP

(57) ABSTRACT

The invention relates to a laminar structure (10) providing adaptive thermal insulation, comprising a first layer (12), a second layer (14), at least one cavity (16) provided in between the first layer (12) and the second layer (14), the cavity (16) being enclosed by a water vapor permeable and at least temporarily gas impermeable envelope (20); a gas generating agent (18) having an unactivated configuration and an activated configuration, the gas generating agent (18) being adapted to change from the unactivated configuration to the activated configuration, such as to increase a gas pressure inside the cavity (16), in response to an increase in temperature in the cavity (16), the first layer (12), the second layer (14) and the cavity (16) being arranged such that a distance (d) between the first layer (12) and the second layer (Continued)

(14) increases in response to the increase in gas pressure inside the cavity (16).

19 Claims, 10 Drawing Sheets

(51) Int. Cl.
 *A41D 31/00* (2006.01)
 *B32B 5/26* (2006.01)
(58) Field of Classification Search
 USPC .................................................. 428/34.1, 35.2
 See application file for complete search history.

(56) References Cited

U.S. PATENT DOCUMENTS

| | | | |
|---|---|---|---|
| 2009/0111345 A1 | 4/2009 | Panse et al. | |
| 2009/0181254 A1* | 7/2009 | White | B01J 13/10 |
| | | | 428/402.2 |

FOREIGN PATENT DOCUMENTS

| | | |
|---|---|---|
| DE | 3625080 | 1/1988 |
| EP | 0689500 | 1/1996 |
| EP | 1579830 | 9/2005 |
| JP | H05-004291 A | 1/1993 |
| JP | 2001-214318 A | 7/2001 |
| JP | 3768359 B2 | 4/2006 |
| JP | 2007-530799 A | 11/2007 |
| JP | 2010-255129 A | 11/2010 |
| WO | WO99/05926 | 2/1999 |
| WO | WO2008/097637 | 8/2008 |
| WO | WO2009/025892 | 2/2009 |

OTHER PUBLICATIONS

European International Search Report, PCT/EP2011/051264, 2 pages, Oct. 10, 2011.

* cited by examiner

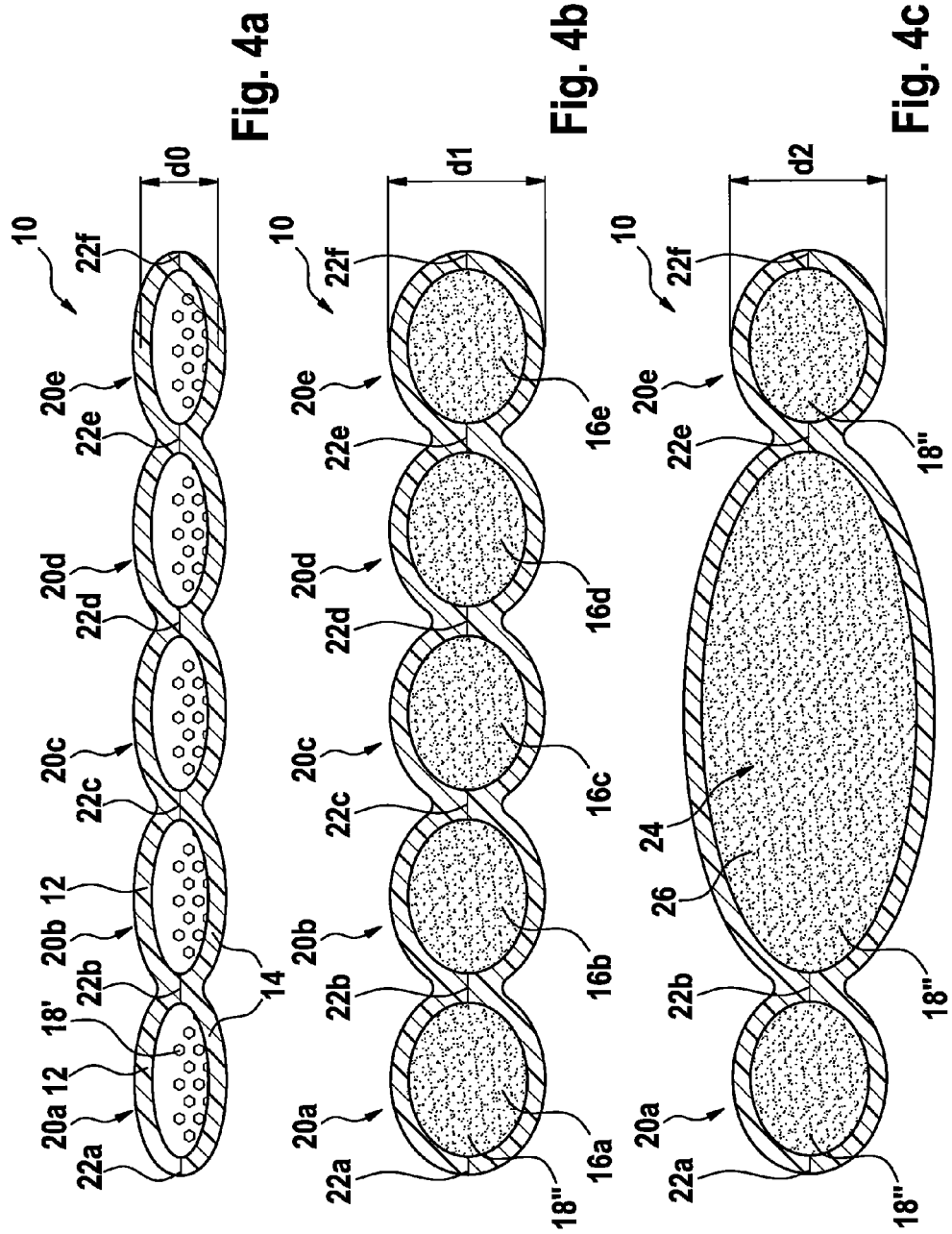

LAMINAR STRUCTURE PROVIDING ADAPTIVE THERMAL INSULATION

The present invention relates to structures providing adaptive thermal insulation, and in particular relates to a laminar structure providing adaptive thermal insulation. Such laminar structure may be used in the design of fabrics or textiles, in particular in applications for personal protective equipment, e.g. garment, like protective garment or other functional garment like gloves.

Protective garment or functional garment is typically used in applications, like fire fighting, law enforcement, military or industrial working, where protection of the wearer against environmental influence is required, or where it is required to provide desired functional characteristics under given environmental conditions. The garment may be required to protect a wearer against heat, flame, or impact by liquids. On the other hand, it is desired that the garment provides sufficient comfort for the wearer that he is able to do the work he is supposed to do.

To mention fire fighter's garment, as one application where protective garment or functional garment is used, such garment is required to provide, on the one hand, a significant degree of thermal insulation against flame and heat. This requires the garment to efficiently suppress heat transfer through the garment from the outside to the inside. Typically, fire fighter's garment is required to provide sufficient flexibility and breathability to allow the fire fighter to do his work efficiently while wearing the garment. This requires the garment to allow to some degree water vapor transfer (breathability) through the garment from the inside to the outside.

Thermal insulation to be provided by fire fighter's garment is required to be effective under a wide range of environmental temperatures: To mention an extreme case, fire fighter's garment is required to provide sufficient thermal insulation to protect a fire fighter when exposed to a "flashover" of flames in a fire where environmental temperatures may be about 1000° C. and higher. In such case the garment will, at least temporarily, be exposed to a temperature at the outer shell of the garment of about 800-900° C. In case of severe fires, still the outer shell of the garment is expected to be at temperatures up to about 350° C. when the fire fighter has to approach flames closely. The temperatures at the skin of the fire fighter preferably should be reduced to an increase in no more than about 24° C.

In technical non fire related tasks the traditional fire fighter garment offers a level of thermal performance which is usually not needed and leads to low comfort (like low breathability of the garment) due to thick and heavy garment layers. In applications like the fire fighter's garment mentioned above, where the garment is required to provide for a wide range of thermal insulation, it is typically difficult to meet all requirements (high breathability, high thermal insulative properties) by static structures, i.e. by structures providing thermal insulation, as required in a worst case scenario, for all time.

A number of dynamic concepts have been suggested. The idea behind such dynamic concepts is to create a structure that provides different degrees of thermal insulation according to given environmental conditions. The thermal insulation provided may adapt to environmental temperatures as experienced by the structure, on its outer side and/or on its inner side.

In the field of fire protection the concept of intumescent systems has been developed and is used in a variety of applications, e.g. in intumescent gaskets for fire doors, or in the form of intumescent coatings for pipes. Such intumescent systems typically involve an intumescent substance having a solid body that is subject to a foaming process under exposure to heat, thus increasing the volume and therefore the insulative property. Usually such foaming process starts when the intumescent substance is subject to a predetermined activation temperature. As a result of the foaming process, the intumescent substance becomes porous, i.e. reduces its density and increases its volume, but still remains to have a solid structure. Typical intumescent substances are sodium silicate, expandable graphite or materials containing carbon and/or significant amounts of hydrates.

It has been suggested to use intumescent materials for producing fire fighter's garment or other functional garment. US 2009/0111345 A1 discloses a structure providing adaptive insulation for waterproof water vapor permeable fabrics/garments to protect the wearer from heat or flame while maintaining breathability. An intumescent substance based on a polymer resin-expandable graphite mixture is positioned in between a flame barrier and a liquid-proof barrier. US 2009/0111345 A1 specifies an activation temperature of about 200° C. and a volume increase of the intumescent substance of at least 200% after exposure to 300° C. for 90 s. Tests have shown that this approach when applied to fabrics of fire fighter's garment has limitations.

A further approach for manufacturing a flame retardant flexible material that provides thermal protection through an intumescent mechanism is shown in WO 2009/025892 A2. In this material a plurality of discrete guard plates are affixed to an outer surface of a flexible substrate fabric in a spaced relationship to each other. The guard plates include an intumescent material which significantly expands upon exposure to sufficient heat. Thereby a continuous thermally insulating and flame retardant outer shell film is formed upon activation. In an embodiment, the guard plates include heat expandable microcapsules that include water or a water based solution which evaporates upon exposure to heat, thereby absorbing heat from the flame source and expanding the microcapsules until they rupture and release their content to drive oxygen away and quench the flame. Activation temperatures of the water-encapsulating microcapsules are reported to be about 100° C.-400° C.

As alternative to intumescent systems, it has been suggested to provide adaptive thermal insulation for fire fighter's garments using shape memory alloy material or bi-metallic material, see WO 99/05926 A1. According to this approach a dynamic, thermally adaptive, insulation system is based on a spacer material arranged in between an outer shell fabric and an inner liner fabric. The spacer material may be a shape memory alloy trained in helical shape, trough shape, or coil shape, or may be bi-metallic strips or snap disks. Activation temperatures of about 65° C.-75° C. (shape memory alloy), and 50° C. (bi-metallic strips) are reported. In contrast to the suggestions based on intumescent systems discussed above, WO 99/05926 A1 in principle provides for a reversible system that can run through a plurality of activation/deactivation cycles.

WO 2008/097637 A1 discloses a composite fabric system having a thermal barrier comprising an outer shell fabric, a moisture barrier and a thermal liner. The thermal liner comprises at least one thermally expanding flame resistant fabric made from crimped, heat resistant fibers held in a state of compression by a thermoplastic binder in an unactivated condition. When the thermal liner is exposed to heat or flame, the liner is reported to increase its thickness by at least three times.

The invention aims in providing an improved laminar structure allowing adaptive thermal insulation with respect to high temperatures. In a particular application, the invention aims in providing a fabric for use in protective and/or functional garment, particularly for use in fire fighter's garment, said fabric including such improved laminar structure.

The invention provides for a laminar structure providing adaptive thermal insulation, comprising a first layer; a second layer; at least one cavity provided in between the first layer and the second layer; the cavity being enclosed by a semipermeable envelope; a gas generating agent having an unactivated configuration and an activated configuration; the gas generating agent being adapted to change from the unactivated configuration to the activated configuration, such as to increase a gas pressure inside the cavity, in response to an increase in temperature in the cavity; the first layer, the second layer and the cavity being arranged such that a distance between the first layer and the second layer increases in response to the increase in gas pressure inside the cavity.

The invention provides an adaptive thermal insulation structure that increases its thermal insulation capability in response to increase in temperature. It has been demonstrated recently that such structure may show a distinct increase in thermal insulation capability when temperature increases from a range of normal or operation temperatures to a range of elevated temperatures. In some embodiments a distinct increase from a first (usually lower) thermal insulation capability at lower temperatures to a second (usually larger) thermal insulation capability at higher temperatures can be obtained. In preferred embodiments the distinct increase in thermal insulation capability may be associated with an activation temperature, i.e. the structure is activated when temperature increases to the activation temperature or above.

Laminar structure as used herein defines a structure having, at least in the unactivated condition of the structure, a planar or sheet like configuration extending essentially in lateral directions, as defined by length and width directions, and being thin. A configuration is considered thin if it has a thickness in the direction orthogonal to length and width direction that is much smaller than length and width. In typical applications, the laminar structure as defined herein will be a flexible laminar structure with respect to bending or a rigid laminar structure.

The first and second layers may be layers arranged such as to face each other in thickness direction of the laminar structure. The first and second layers do not necessarily need to be adjacent layers. Besides the cavity, other structural elements of the laminar structure, e.g. insulating material, may be interposed in between the first and second layers. The first and second layers will usually extend essentially parallel to each other and orthogonal to the thickness direction. Distance between the first and second layers can be measured in thickness direction. In case the first and/or second layers are not in the same plane, but have a structure with embossments and/or depressions, distance between the layers is meant to refer to a given reference plane. In practical implementations, the first and second layers may e.g. be layers of a fabric, e.g. an inner fabric layer and an outer fabric layer, with the cavity being sandwiched in between the inner layer and the outer layer. In view of applications of the inventive laminar structure to fabrics used in garment "inner layer" means the layer is directed to the body of the wearer and arranged as close as possible to the skin of the wearer. "Outer layer" means the layer is directed away from the body of the wearer to the environment.

When being subject to increasing temperature, the gas generating agent will start to produce gas in the cavity, and hence gas pressure in the cavity will increase. Increasing gas pressure inside the cavity leads to an "inflation" of the cavity. As a result of the inflation, the cavity increases its thickness, and thereby increases the distance between the first layer and the second layer. The result is a "gas layer" or "air layer" being formed in between the first layer and the second layer, which provides for efficient thermal insulation because of the low thermal conduction of gas/air, and because of the increased distance between the first and the second layer.

The gas generating agent is the "driver" for movement of the first and second layers away from each other, in order to increase the distance in between the first and second layers and to increase an insulating volume. Depending on temperature, the gas generating agent may have an unactivated configuration and an activated configuration. In the unactivated configuration of the gas generating agent the adaptive thermal insulation structure is in its unactivated condition. The activated condition of the adaptive thermal insulation laminar structure is obtained by the change of the configuration of the gas generating agent.

The gas generating agent, in the unactivated configuration, may be included in the cavity. The gas generating agent may be any of a liquid, a solid, or a gel, or combinations thereof. The gas generation may occur via a physical transformation (i.e. a phase transition from liquid to gas and/or from solid to gas and/or release of adsorbed gases), or via a chemical transformation (i.e. a chemical reaction releasing at least one gaseous product), or by combinations thereof. It has been found that a desired activation threshold of the gas generating agent, e.g. an activation temperature, can be adjusted suitably well by providing the gas generating agent in the form of a mixture of at least two compounds.

According to the invention, the cavity and the gas generating agent form together with the first and second layer a thermally activated, inflatable composite structure that, when subject to increased temperature, increases its volume. The invention thus provides for an effect resembling the behavior of intumescent substances when subject to increased temperature, but uses a process entirely different from intumescence. In the laminar structure described herein, the cavity and the gas generating agent are configured in such a way that the increase in volume leads to a pronounced increase in distance between the first and second layers. Thereby an insulating volume filled essentially by gas and/or air is created in between the first and second layers. Different from known intumescent substances which change configuration from a compact solid structure into a porous solid structure with increasing temperature, the "quasi-intumescent" composite structure according to the invention changes its configuration from an uninflated condition at lower temperatures to an inflated condition at higher temperatures. In contrast to known intumescent substances where a foaming process is started after activation and with the result that a vast plurality of individual cavities are formed, the invention provides for a cavity of predetermined geometry already present in the unactivated condition. After activation this cavity changes its shape such as to increase volume and/or to increase the distance in between the first layer and the second layer.

The inventors have found that such a "quasi-intumescent" composite laminar structure can be much better adjusted and controlled in terms of its activation temperature and the rate of activation (i.e. rate of increase in thermal insulation capability with increase in temperature when temperature has reached the activation temperature), than any known intumescent substances. Moreover, it has been shown that even reversible "quasi-intumescent" composite laminar structures can be produced, which allow to reset the system from an activated condition into an unactivated condition, even in a plurality of cycles, if desired.

The laminar structure comprises a semipermeable envelope enclosing the cavity. The term "semipermeable" as used herein refers to the envelope and the material from which the envelope is made being, on the one hand, permeable for polar (hydrophilic) gases like water vapor and, on the other hand, at least temporarily gas impermeable. Gas impermeable means at least impermeable for at least one gas that is produced by the gas generating agent when changing its configuration from the unactivated configuration to the activated configuration.

Being at least temporarily gas impermeable implies that the envelope has gas retention capability for a desired time and with respect to at least one of the gases that are produced by the gas generating agent when changing its configuration to the activated configuration. In particular embodiments, the envelope is impermeable for unpolar gases like $CO_2$, $N_2$, $O_2$.

Preferably, the envelope is made of a gas impermeable material having a Gurley number of 500s and more, preferably 1500s and more, measured in a Genuine Gurley Densometer Model 4340 Automatic Densometer. The Gurley air flow test measures the time in seconds for 100 cc of air to flow through a one square inch sample of the material at 4.88 inch (124 mm) of water pressure.

In one embodiment the envelope is water vapor permeable and at least temporarily gas impermeable.

Particularly, the envelope may be configured such that a volume of the cavity increases in response to the increase of the gas pressure inside the cavity. A cavity enclosed by a water vapor permeable or breathable envelope allows maintaining breathability of the laminar structure over the whole area covered by the cavity. This applies in the unactivated condition of the laminar structure when the gas generating agent is in its unactivated configuration, as well as in activated condition of the laminar structure when the gas generating agent is in its activated configuration. In this way, the whole area of the laminar structure may be covered by an envelope or a plurality of envelopes according to the invention without significant loss in breathability of the laminar structure.

The term "water vapor permeable" or "breathable" as used herein is understood to specify the characteristic of a layer or structure, e.g. the envelope, or the laminar structure, or a fabric or garment including such laminar structure, to be able to transport water vapor from one side of the layer or structure to its other side. In embodiments the layer or structure may be also water tight in comprising at least one functional layer being water tight and water vapor permeable (breathable).

The term "water vapor permeable layer" or "breathable layer" as used herein is intended to include any layer which ensures a water vapor transmission through a layer or said laminar structure or layered composite. The layer might be a textile layer or a functional layer as described herein. The functional layer may have a water vapor permeability measured as water vapor transmission resistance (Ret) of less than 30 $(m^2Pa)/W$.

The water vapor transmission resistance or resistance-evaporation-transmission (Ret) is a specific material property of sheet-like structures or composites which determine the latent evaporation heat flux through a given area under a constant partial pressure gradient. A laminar structure, fabric composite, textile layer or functional layer according to the invention is considered to be water vapor permeable if it has a water vapor transmission resistance Ret of below 150 $(m^2Pa)/W$. The laminar structure, fabric composite, textile layer or functional layer preferably has a Ret of less than 30 $(m^2Pa)/W$. The water vapor permeability is measured according to ISO EN 11092 (1993).

The envelope is at least temporarily gas impermeable. Gas impermeable means at least impermeable for at least one of the gases that are produced by the gas generating agent when changing its configuration to the activated configuration, i.e. when temperature increases to the activation temperature or above. At least temporarily gas impermeable is intended to specify that the envelope is able to hold at least one of the gases generated by the activation of gas generating agent within the cavity for a time longer than the expected duration of a high temperature event like a flash over of a flame.

Flame resistant materials are specified in international standard DIN EN ISO 14116 (2008). EN ISO 15025 (2003) specifies test methods for assessing flame resistance of materials. According to DIN EN ISO 14116 (2008), different levels of flame resistance are specified. As an example, flame resistant materials to be used for fire fighter's garments are required to pass the test procedures specified for level 3 in DIN EN ISO 14116 (2008). For other applications less strict criteria, as specified for levels 1 and 2, may be sufficient.

The envelope may comprise a functional layer. The term "functional layer" as used herein defines a film, membrane or coating that provides a barrier to air penetration and/or to penetration of a range of other gases, for example gas chemical challenges. Hence, the functional layer is air impermeable and/or gas impermeable. This in particular holds with respect to the gas generated by the gas generating agent when being transformed into its activated configuration. Air impermeable and/or gas impermeable means that the functional layer has a Gurley number of 500s and more, preferably 1500s and more, measured in a Genuine Gurley Densometer Model 4340 Automatic Densometer. The Gurley air flow test measures the time in seconds for 100 cc of air to flow through a one square inch sample at 4.88 in (124 mm) of water pressure. The functional layer is in this particular embodiment air impermeable, but it might be air permeable in other embodiments.

In further embodiments the functional layer also provides a barrier to liquid water penetration, and ideally to a range of liquid chemical challenges. The layer is considered liquid impermeable if it prevents liquid water penetration at a pressure of at least 0.13 bar. The water penetration pressure is measured on a sample of the functional layer based on the same conditions described with respect to ISO 811 (1981).

The functional layer can be realized using suitable membranes, e.g. microporous membranes made from expanded polytetrafluoroethylene (PTFE).

The functional layer may comprise in one embodiment one or more layers wherein the functional layer is a water vapor permeable and air-impermeable membrane to provide air impermeable but water vapor permeable (breathable) characteristics. Preferably the membrane is also liquid impermeable, at least water impermeable.

A suitable water impermeable and water vapor permeable flexible membrane for use herein is disclosed in U.S. Pat. No. 3,953,566 which discloses a porous expanded polytetrafluoroethylene (ePTFE) material. The porous expanded PTFE material has a micro-structure characterized by nodes interconnected by fibrils. If desired, the water impermeability may be enhanced by coating the expanded PTFE with a hydrophobic and/or oleophobic coating material as described in U.S. Pat. No. 6,261,678.

The water impermeable and water vapor permeable membrane might also be a micro-porous material such as high molecular weight micro-porous polyethylene or polypropylene, micro-porous polyurethane or polyester, or a hydrophilic monolithic polymer such as polyurethanes or polyesters, e.g. polyether polyurethanes or polyether polyesters.

The functional layer may be made of a laminate material, e.g. as described in U.S. Pat. No. 4,194,041.

In further embodiments the first layer and/or the second layer comprises a functional layer. In other embodiments a functional layer may form an additional layer of the laminar structure.

Typically, the gas generating agent, when being in its unactivated configuration, will be included in the cavity. The gas generating agent may be adapted to generate gas in the cavity in response to temperature in the cavity exceeding a predetermined activation temperature, such that the distance between the first layer and the second layer increases from a first distance in the unactivated configuration of the gas generating agent to a second distance in the activated configuration of the gas generating agent.

Activation temperature is meant to be a temperature at which the gas generating agent starts to produce a significant amount of gas in the cavity, gas pressure in the cavity starts to increase, and increasing gas pressure inside the cavity leads to a volumetric increase (inflation) of the cavity.

The second distance between the first layer and the second layer in the activated configuration of the gas generating agent may be larger by 1 mm, or more, than the first distance between the first layer and the second layer in the unactivated configuration of the gas generating agent. In particular embodiments the second distance may larger than the first distance by 3 mm, or more, or may even be larger by 6 mm, or more.

In a further embodiment the envelope may include a water absorbing material. In particular, the envelope can be made of material that has water absorbing characteristics. A water absorbing material has the capability of integrating water molecules into its structure. Water molecules (water vapor) may permeate through such material in case of differences in partial pressure of water vapor across the material. Therefore, such material is generally breathable. However, despite being water vapor permeable such water absorbing material will be impermeable to other gases, especially non-polar gases, in case such material is not capable to integrate other (gaseous) molecules than water molecules into its structure. Gas impermeability may be given for a wide range of molecules other than water molecules, or may be given selectively for a number of molecules only.

In one embodiment the envelope material may be permeable for hydrophilic (polar) gases (e.g. water vapor) and substantially non permeable for unpolar gases like $CO_2$, $N_2$, $O_2$, etc.

Using a water absorbing material for the envelope allows to maintain water vapor permeability, but provides for gas impermeability with respect to gas produced after activation of gas generating agent.

Another example for a water vapor permeable and water absorbing material is a closed cell microporous material.

One example for a water absorbing material as specified above is polyurethane (PU).

In further embodiments, the envelope may comprise a stretchable material or an elastic material. The envelope may even be made of a stretchable material or an elastic material. A material is considered to be stretchable if it is able to elongate in at least one direction when the envelope is subject to an increased gas pressure after activation. In particular, a material may be considered to be stretchable if a layer or structure of such material, e.g. an envelope layer or envelope part, achieves a strain at break of at least 50% or more according to the specification set out in EN-ISO 527-1,2,3 (1996), when measured at a deformation rate of 200 mm/min.

At least parts of the envelope according to the invention may be made of stretchable material.

By elongation after activation, an even larger separation of first layer and second layers may be provided.

Besides the elongation of the envelope parts made of stretchable material, the envelope may change its shape from a "flat shape" towards a "convex shape" after activation, such as to increase distance between the first and the second layer. Such change in shape is due the tendency of the cavity to increase its volume for given surface area of the envelope under the gas pressure created as more and more gas generating agent changes from unactivated configuration to activated configuration. This process leads to increase in mean "thickness" or "height" of the cavity, and thereby increases the distance between the first and the second layer. The envelope may have the form of a pad or chip, the pad or chip being flat in the unactivated condition and changing shape to the shape of an inflated pillow in the activated condition.

In principle, the envelope may be made up of a single layer or piece, but in most cases will be made up of several layers or pieces that are bonded together.

In an embodiment the envelope may have a composite structure of a plurality of layers attached to each other. In one embodiment the layers may be bonded together by lamination, either bonded in discrete areas or bonded over the entire areas thereof. Two or more layers may be laminated onto each other. Such composite structure is semipermeable as defined herein. In an envelope having such composite structure, each layer of said layered structure provides for water vapor permeability. It is generally sufficient if at least one of the layers provides for gas impermeability as defined herein.

In some embodiments the envelope may be made of at least two envelope pieces. The at least two envelope pieces may be bonded together such as to enclose the cavity in between. Each envelope piece may comprise the composite structure of a plurality of layers as described above. In such configuration, preferably each of the envelope pieces provides for water vapor permeability and gas impermeability.

In an embodiment the envelope may be made of at least a first semipermeable envelope layer and at least a second semipermeable envelope layer, each of a sheet like material being water vapor permeable and at least temporarily gas impermeable, as desired. These two envelope layers may be bonded together along a sealing structure forming a closed loop, such that the cavity is enclosed by the layers. Each of the envelope layers may have a monolayer structure, but may also have a composite laminate structure made up from a plurality of layers laminated onto each other, as described, or the first envelope layer may have a monolayer structure and the second envelope layer may have a composite laminate structure. In another embodiment the envelope layers may be made of a fluid tight single layer (monolayer). Said layer might be formed to the envelope by welding or gluing.

The first and second envelope layers can be made of different material, providing the envelope with different characteristics in different sections thereof. In an example the envelope can be made of two envelope layers of different material, a first envelope layer of an essentially non-stretchable material, and a second envelope layer of a stretchable material. In the activated configuration of the gas generating agent, under pressure generated in the cavity, predominantly the second envelope layer will stretch, i.e. elongate in at least one direction, whereas the first envelope layer will not significantly elongate in any direction. In such configuration the second envelope layer will provide for increase of the distance between the first layer and the second layer of the laminar structure, thereby providing for a thick insulating volume, on the one hand. The first envelope layer, on the other hand, will provide for dimensional stability and thus a fabric including a laminar structure as described here will remain its shape and size even when being subject to very high temperatures as they do occur in certain emergency events (e.g. a fire flashover). Further, the direction of inflation of the envelopes can be adjusted particularly well.

As an example, DIN EN 469 (2007) requires for protective firefighter's garments, that a fire protective fabric does not shrink by more than 3% when being subject to 180° C. in an oven. Such requirement can be met in case the envelope includes at least one envelope layer made of non-stretchable material as described above. In one embodiment, the "inner" envelope layer, i.e. the layer closer to the body of the wearer, could be made of a stretchable material, whereas the outer envelope layer could be made of a non-stretchable material.

In a particular embodiment, the envelope may be made of a temperature resistant material with respect to a range of temperatures in the cavity in the activated configuration of the gas generating agent.

The term "temperature resistant" is understood to specify that the material is able to withstand a loading temperature, which is higher than the activation temperature by a predetermined temperature increase, e.g. by an increase of 10° C., for a predetermined time. Typically the temperature is 10° C. above the activation temperature, and the time is 1 minute or longer. The required temperature resistant properties depend on the application of the laminar structure, e.g. on the position of the laminar structure in a garment with respect to other layers in the garment. The more the laminar structure will be located towards the source of a heat, the higher will be the requirements for the temperature resistance. In one embodiment the temperature is at least 10° C. above activation temperature for 1 minute. In another embodiment the temperature is 50° C. above activation temperature for 2 minutes. In a preferred embodiment for fire fighter applications the temperature is around 150° C. above activation temperature for 2 minutes.

A number of materials may be used to form a semipermeable envelope layer. In some examples the laminar structure may comprise:
1. A first and a second layer, each made of a monolithic layer of polyurethane or a similar material. The envelope is formed by bonding the first and second layers together along a bonding portion forming a closed loop.
2. A first and a second layer, each made of a laminate structure with a monolithic layer of polyurethane or a similar material which is attached to a layer of expanded porous PTFE. The envelope is formed by bonding the first and second layers together along a bonding portion forming a closed loop.
3. A first and a second layer, each made of a laminate structure with a monolithic layer of polyurethane or a similar material which is sandwiched in between two layers of expanded porous PTFE. The envelope is formed by bonding the first and second layers together along a bonding portion forming a closed loop.
4. A first layer and a second layer of different material:
    a) A first layer comprising a barrier laminate including a membrane comprising an ePTFE membrane and a textile layer. The textile layer may be made of non woven textile. The membrane may be made as described in U.S. Pat. No. 4,194,041.
    b) a second layer in the form of a barrier membrane including an ePTFE membrane. The barrier membrane is made according to U.S. Pat. No. 4,194,041

The envelope is formed by bonding the first and second layers together along a bonding portion forming a closed loop. Layers made of PU can be used as bonding layers by melting of the PU material. In case any of the layers to be bonded with another layer is made of ePTFE, bonding can be achieved by use of suitable adhesives, e.g. silicone adhesives.

An additional sealing layer may be applied to the envelope layer at least on one side thereof, e.g. by calendering. The sealing layer may include a thermoplastic polymer (e.g. polyurethane (PU); polypropylene (PP); polyethylene (PE); polyester (PES)). The sealing layer may improve the tightness of the envelope and may allow welding of two envelope layers together to generate the envelope. To enhance the adhesive characteristics of the envelope layer, a pretreatment of the layer surfaces, e.g. by corona discharge, plasma discharge, primers, can be used. Possible welding methods include heat sealing, ultrasonic welding, laser welding and microwave welding.

In a further possible embodiment, one or a plurality of glue beads e.g. made from a thermoplastic glue, silicones, contact adhesives, reactive glue systems is applied to at least one of the surface of the envelope layers to be bonded, an then the other surface is attached to the glue bead.

In embodiments a solid or gel may be used as gas generating agent. Such solid is preferably in the form of a powder. A gel is a compound having functional groups embedded therein according to chemical and/or physical bonding mechanisms. A gas generating agent in the form of a gel is easy to handle for the dosing process and has a lower abrasion in comparison to a powder. Examples for gels are hydrogels. Gels may have a limited fraction of solids. Typically, gas is released by a chemical reaction, see below. Good handling is provided in case a solid gas generating agent in the form of a powder in its unactivated configuration is used.

The activation of the gas generating agent may involve a physical transformation, namely a phase transition into gaseous phase.

It is not desired to transform thermal energy into latent heat, in order to slow down increase in temperature. Rather, it is intended to transform all thermal energy into an increase of the distance between first layer and second layer. In case the phase transition does not need to provide for latent heat, gas production in the cavity is fast, and hence a fast increase in the distance between the first layer and the second layer can be achieved at the activation temperature. This is particularly advantageous at low activation temperatures, since it has been found out that fast activation rates can be obtained down to rather low activation temperatures of about 50° C. In a garment, therefore, the inventive laminar structure need not be located close to the outer side which is usually exposed to highest temperatures, e.g. in a flame. Rather, it is possible to locate the laminar structure more to the inner side, i.e. towards the skin of a wearer. Such an arrangement reduces the requirements on thermal resistance of the materials used.

In another embodiment the gas generating agent may have a low activation energy in case of physical desorption or chemical reaction.

The gas generating agent preferably is a solid in the unactivated configuration and has the function to generate gas at temperatures above ambient. A gas generating agent in a solid state is preferably provided in the form of a powder or granular substance. The powder is composed of particles with grain size. After activation at least one gaseous product is produced from the powder or granular substance. The gaseous product preferably is not soluble in water. Using a gas generating agent in powdery or granular form has the advantage of relatively unproblematic handling.

When the gas generating agent is a solid or a gel, activation may more easily be achieved by a chemical process producing a compound that is released into the gaseous phase. In such embodiment, the activation temperature of the adaptive thermal insulation laminar structure will be a temperature which corresponds to the activation energy of a chemical reaction leading to release of at least one gaseous compound from the gas generating agent. A number of chemical reactions producing gaseous reaction products are known. Examples are: release of gaseous compounds embedded in a gel; soda-reaction; release of ammonia and hydrochloric acid from ammonium chloride.

An example of a solid gas generating agent is sodium bicarbonate ($NaHCO_3$, also known as "baking soda", CAS-No 144-55-8) powder. Starting at 55° C., sodium bicarbonate gradually decomposes into sodium carbonate ($Na_2CO_3$), water ($H_2O$) and carbon dioxide ($CO_2$). The conversion rate increases with increasing temperature:

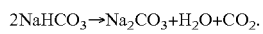

$$2NaHCO_3 \rightarrow Na_2CO_3 + H_2O + CO_2.$$

Sodium bicarbonate as well as mixtures of substances including sodium bicarbonate are conceivable.

Further examples of gas generating agent systems showing decomposition reactions are gas generating agents including ammonium carbonate $(NH_4)_2CO_3$ which decomposes under heat into ammonia ($NH_3$) and carbon dioxide ($CO_2$) and $H_2O$; and the decomposition of ammonium formate to HCN and $H_2O$.

Another example is a gas generating agent including ammonium chloride ($NH_4Cl$) which decomposes into ammonia ($NH_3$) and hydrogen chloride (HCl). This reaction is in principle reversible and may provides a plurality of activation/deactivation cycles.

In an embodiment, the envelope may include an intermediate layer separating the cavity into a first subcavity and a second subcavity. Such intermediate layer may be made of a gas impermeable material and may be configured to support the formation of a gas tight seal when being welded together with the material of the envelope. The gas generating agent may be applied to one or both sides of the intermediate layer.

In a further embodiment an envelope structure may be provided, such envelope structure being formed by at least two envelopes bonded together. Such envelope structure allows an even stronger increase in distance between the first and second layers when the gas generating agent becomes activated. The increase in thermal insulation capacity of a laminar structure can be enhanced very efficiently by providing such envelope structure. In one conceivable configuration the envelopes are bonded together at lateral ends thereof.

The envelope may even be designed in such a way as to intentionally rupture after activation and release the gas generating agent. The gas generating agent thereby may be used to suppress flames. This implies that the increase in thermal insulation is only temporarily, as the gas generating agent will slowly escape from the cavity after the envelope has ruptured. However, a single use design of the envelope, as described here, implies that the envelope stretches to the maximum possible extent, and hence allows the envelope to increase its volume to a maximum possible extent. This is a way to increase the thermal insulation capability of the laminar structure fast and efficiently. In a catastrophic event, e.g. a flashover of flames, this may provide the only way to survive. In such single use design it is acceptable if the chemical conversion of the gas generating agent is an irreversible chemical reaction. It is more important that a large amount of gas is produced in a short time once temperature exceeds the activation threshold.

In further embodiments the laminar structure may comprise a plurality of envelopes. The envelopes may be arranged contiguously to each other. In such contiguous arrangement of envelopes at least two adjacent envelopes follow each other without a gap. Typically such adjacent envelopes share a common bonding area or sealing area. Alternatively, some or all of the envelopes may be arranged such as to overlap each other at least partly, e.g. in a structure similar to roof tiles. In such arrangements, the laminar structure as a whole may be formed by envelopes arranged substantially without any open spaces between the first layer and the second layer. A laminar structure is obtained with no spaces or gaps uncovered by any of the envelopes, neither in the unactivated condition nor in the activated condition.

As mentioned before, the envelope may have the form of a pad or chip, the pad or chip being flat in the unactivated condition and changing its shape to the shape of an inflated pillow in the activated condition. Such structure may be formed in an embodiment by a first layer of a semipermeable (water vapor permeable and at least temporarily gas impermeable) material, and a second layer of a semipermeable (water vapor permeable and at least temporarily gas impermeable) material, the first layer being located adjacent to the second layer.

Practically, the first layer will be arranged on top of the second layer in a laminated structure. The first and second layers may be bonded together along at least one bonding portion, such as to form the cavity in between the first and second layers. The bonding portion typically will have the form of a closed loop, in order to form a cavity enclosed by the first and second layers. For providing a plurality of cavities, a plurality of bonding portions may be provided, each bonding portion forming a closed loop for defining the respective cavity. The bonding portions may have the form of a grid with a first subset of bonding portions extending parallel to each other in a first direction and a second subset of bonding portions extending parallel to each other in a second direction.

Each of the envelopes enclosing a respective cavity may have the form of a "pocket" formed in between first and second layers of the laminar structure by bonding the first and second layers together. The first and second layers thereby form the first and second envelope layers of each envelope.

Other embodiments provide a laminar structure having at least one cavity structure made of a plurality of cavities interrelated with each other after activation of the gas generating agent. Such cavity structure may comprise a plurality of contiguous envelopes each enclosing a respective cavity. Each of these cavities, in the unactivated configuration of the gas generating agent, may be separated from its neighbouring cavities via respective bonding portions formed in between the respective adjacent envelopes. The bonding portions preferably provide for essentially gas tight separation of the cavities from each other. Hence, gas generating agent cannot pass from one cavity to another, irrespective of being in the activated or in the unactivated configuration. However, the bonding portions may include predetermined breaking portions, respectively. Such breaking portions are adapted to rupture or break when being subject to gas pressure larger than a threshold pressure. Therefore, after activation of the gas generating agent in only a part or even in each of the cavities of the cavity structure, the increasing gas pressure produced in the cavities in the activated configuration of the gas generating agent provides for a gas communication between adjacent cavities of the cavity structure. As a result, a "macro-cavity" or "super-cavity" is produced by effectively combining all cavities in the cavity structure. Typically, rupture of a first cavity will occur once pressure in that cavity increases beyond a threshold pressure. In most cases, one or several of the cavities will be closer to the source of heat than other, and thus pressure inside these cavities will increase first beyond the threshold.

In further embodiments, such cavity structure may comprise a plurality of cavities arranged in a cluster. The cavities of the cluster are, in principle, separated from each other in a configuration preventing that gas generating agent, at least when being in its unactivated configuration, is able to be transferred from one cavity to another. Nevertheless, under specific conditions, in particular after activation of the gas generating agent, the configuration of the cavities allows a fluid communication between the cavities for the activated, and thus gaseous, gas generating agent. Because of such fluid communication, rupture of the portions separating the cavities may be facilitated, and thus formation of a macro-cavity from the cavities of the cluster may be promoted.

In an embodiment connecting channels may be provided between respective adjacent cavities of the cluster. Such connecting channels may have a structure, e.g. being thin enough and/or having an angled structure, to prevent passage of gas generating agent when being in the unactivated configuration, but to allow for passage of the gas generating agent when being in the activated configuration.

Efficient increase in thickness of the cavities, corresponding to a significant increase in thermal insulation capability, after activation of the gas generating agent can be achieved, because there will be a threshold pressure above which the bonding portions between the plurality of adjacent cavities in the cavity structure rupture at their breaking portions, such that all the (original) cavities are combined to a large common "macro-cavity" or "super-cavity".

The configuration of the laminar structure, as outlined above, allows for provision of macroscopic cavities enclosed by respective macroscopic envelopes, which can be activated when subject to heat. Also such "macro-envelopes" may have the form of "pillows".

Just by way of example, a typical envelope may have in the unactivated configuration of the gas generating agent a lateral dimension of 1 mm or more. In particular embodiments the envelope may have a lateral dimension of 5 mm or more, preferably of 15 mm or more. Typically, the envelope may have a thickness dimension of less than 2 mm. Lateral dimension, as used in this context, refers to the smallest dimension of an envelope in a width/length plane. i.e. in a plane orthogonal to the thickness direction, which in general is the by far smallest dimension of an envelope in the unactivated configuration of the gas generating agent. Therefore, the lateral dimension basically defines the maximum increase in thickness an envelope can reach in the activated configuration of the gas generating agent. A plurality of such flat envelopes may be used to form a flat laminar structure (as described above) which allows a high breathability of the laminar structure and therefore a higher comfort level for the wearer.

The cavity may increase its thickness in the activated configuration of the gas generating agent up to a thickness of at least 2 mm or more, preferably 6 mm or more.

Expressed in term of volume increase, the cavity may have, in the activated configuration of the gas generating agent, a volume increase of between 10 and 1000, or even 2000, with respect to the volume in gas generating agent. Preferably the volume increase may be the unactivated configuration of the above 40. In particular, in case a "macro-cavity" or "macro-envelope" is formed, the volume increase might be as large as a maximum of 2000.

The laminar structure outlined above may be incorporated into a fabric composite structure. The term "fabric" refers to a planar textile structure produced by interlacing yarns, fibers, or filaments. The textile structure may be a woven, a non-woven, a fleece or combinations thereof. A "non-woven" textile layer comprises a network of fibers and/or filaments, felt, knit, fiber batts, and the like. A "woven" textile layer is a woven fabric using any fabric weave, such as plain weave, crowfoot weave, basket weave, satin weave, twill weave, and the like. Plain and twill weaves are believed to be the most common weaves used in the trade.

Such fabric composite structure typically will comprise a plurality of fabric layers arranged to each other. The plurality of fabric layers may include an outer heat protective shell structure having an outer side and an inner side. The plurality of fabric layers may also include the laminar structure providing adaptive thermal insulation, as described above.

In a particular embodiment, the laminar structure providing adaptive thermal insulation may be arranged on the inner side of the outer heat protective shell structure.

As an embodiment the outer heat protective shell structure denotes an outer layer of an article (such as a garment) that provides primary flame protection. The outer heat protective shell structure may comprise a flame resistant, thermally stable textile, e.g. a woven, knit or non-woven textile comprising flame resistant textiles like polyimides (meta-aramid, para-aramid) or blends thereof. Specific examples for flame resistant or thermally stable textiles comprise polybenzimidazole (PBI) fiber; polybenzoxazole (PBO) fiber; poly diimidazo pyridinylene dihydroxy phenylene (PIPD); modacrylic fiber; poly(metaphenylene isophthalamide) which is marketed under the tradename of Nomex® by E.I. DuPont de Nemours, Inc; poly (paraphenylene terephthalamide) which is marketed under the tradename of Kevler® by E.I. DuPont de Nemours, Inc.; melamine; fire retardant (FR) cotton; FR rayon; PAN (poly acrylnitril). Fabrics containing more than one of the aforementioned fibers may also be utilized, (Nomex®/Kevlar®, for example). In one embodiment an outer shell layer made with woven Nomex® Delta T is used.

Flame resistant materials are specified in international standard DIN EN ISO 14116 (2008). EN ISO 15025 (2003) specifies test methods for assessing flame resistance of materials. According to DIN EN ISO 14116 (2008), different levels of flame resistance are specified. As an example, flame resistant materials to be used for fire fighter's garments are required to pass the test procedures specified for level 3 in DIN EN ISO 14116 (2008). For other applications less strict criteria, as specified for levels 1 and 2, may be sufficient.

The fabric may also comprise a barrier structure. In one embodiment the barrier structure will be arranged on the inner side of the outer heat protective shell structure.

In particular applications, the barrier structure comprises at least one water vapor permeable and water proof functional layer comprising at least one water vapor permeable and water proof membrane.

The barrier structure is a component that serves as a liquid barrier but can allow moisture vapor to pass through the barrier. In garment, such as firefighter turn out gear, such barrier structures keep water away from inside the garment and thereby minimize the weight which the firefighter carries. In addition, the barrier structure allows water vapor (sweat) to escape—an important function when working in a hot environment. Typically, the barrier structure comprises a membrane laminated to at least one textile layer like a non-woven or woven fabric. Membrane materials which are used to be laminated to at least one textile layer (also known under the term laminate) include expanded polytetrafluoroethylene (PTFE), polyurethane and combinations of those. Commercially available examples of such laminates include laminates available under the name CROSSTECH® moisture barrier laminates or a Neoprene® membrane on a non-woven or woven meta-aramid fabric.

In one embodiment a barrier structure comprising a membrane of expanded PTFE (ePTFE) made as described in EP 0 689 500 B1 is used. The barrier layer may be adhered to a textile layer made of non-woven aramide textile. Such a barrier structure is commercially available under the name GORE-TEX® Fireblocker N. In another embodiment a barrier structure available under the name CROSSTECH®/Nomex® PJ moisture barrier is used. Such moisture barrier structure comprises an ePTFE film with a polyurethane layer attached to a polyamide textile (Nomex®IIIA). Other barrier may be used, e.g. as described in U.S. Pat. No. 4,493,870, U.S. Pat. No. 4,187,390, or U.S. Pat. No. 4,194,041.

Barriers others than moisture barriers are conceivable, e.g. barriers providing at least one functional layer that prevents permeation of gases and/or liquids like chemical compounds in the form of gases, liquids and/or aerosols, or like substances comprising biological material in the form of gases, liquids and/or aerosols. In particular embodiments also such other barrier layers may also be breathable.

The barrier structure may be positioned in between the outer heat protective shell structure and the laminar structure that provides adaptive thermal insulation. The barrier structure may also comprise the laminar structure providing adaptive thermal insulation.

The fabric may be used in protective garment or functional garment typically used in applications, like fire fighting, law enforcement, military or industrial working, where protection of the wearer against environmental influence is required, or where it is required to provide desired functional characteristics under given environmental conditions. Such garment may be required to protect a wearer against heat, flame, or impact by liquids. On the other hand, it is desired that such garment provides sufficient comfort for the wearer that he is able to do the work he is supposed to do.

In particular, it is intended that the fabric be adapted for use in a fire/heat protective garment.

Exemplary embodiments of the invention will be described in greater detail below taking reference to the accompanying drawings which show embodiments.

FIG. 4a shows a simplified and schematic cross sectional view of a laminar structure, according to an embodiment, formed with a plurality of envelopes, in an unactivated condition;

FIG. 4b shows a simplified and schematic cross sectional view of the laminar structure of the embodiment shown in FIG. 4a, in a first stage of the activated condition;

FIG. 4c shows a simplified and schematic cross sectional view of the laminar structure of the embodiment of FIGS. 4a and 4b in a further progressed stage of the activated condition with a number of bonding portions separating adjacent envelopes broken under gas pressure in the respective cavities;

FIG. 6 shows a fire fighter's jacket including a fabric as shown in FIG. 5a;

Figure 1A:
FIG. 1a shows a simplified and schematic cross sectional view of a layer used to form an envelope in an embodiment.

In all Figures components of respective embodiments being identical or having corresponding functions are denoted by the same reference numerals, respectively. In the following description such components are described only with respect to the first one of the embodiments comprising such components. It is to be understood that the same description applies in respective following embodiments where the same component is included and denoted by the same reference numeral. Unless anything is stated to the contrary, it is generally referred to the corresponding description of that component in the respective earlier embodiment.

FIG. 1a discloses in a simplified and schematic cross sectional view a sheet like layer 8 according to an embodiment. Such layer 8 may be used as an envelope layer 12, 14 to prepare an envelope 20 (see FIG. 2). The layer 8 is made of a semipermeable monolithic layer 8a of hydrophilic material which is at least temporarily gas impermeable, but water vapor permeable. An example for such material is a film of polyurethane (PU) which can have in one embodiment a thickness of 12 µm. To produce an envelope 20, a first and a second envelope layer 12, 14, each made a monolithic layer 8a of hydrophilic material, as shown in FIG. 1a, may be bonded together along a bonding portion forming a closed loop (see FIGS. 2 and 3a, 3b).

Figure 1B:
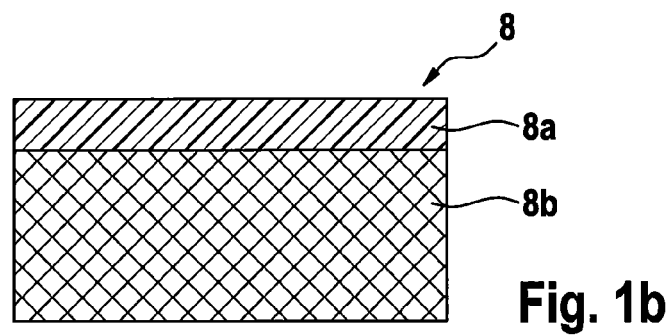
FIG. 1b shows a simplified and schematic cross sectional view of a further layer used to form an envelope in an embodiment.

An alternative layer 8 for forming the envelope 20 is shown in FIG. 1b. This sheet like semipermeable layer 8 is in the form of a laminate and includes a first layer 8a made of a hydrophilic material similar to the embodiment of FIG. 1a, and a second layer 8b made of microporous material as for example microporous expanded PTFE. In one embodiment the first layer 8a can have a thickness of 12 µm and the second layer 8b can have a thickness of 40 µm. The first layer 8a may be attached to the second layer 8b by any known lamination technique, e.g. as described in U.S. Pat. No. 4,194,041.

Figure 1C:
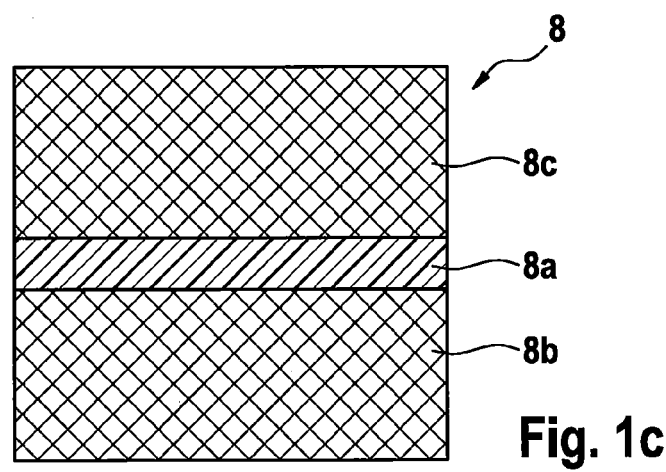
FIG. 1c shows a simplified and schematic cross sectional view of a further layer used to form an envelope in an embodiment.

A further alternative sheet like semipermeable layer 8 for forming the envelope 20 is shown in FIG. 1c. This laminate layer 8 includes a first layer 8a made of a hydrophilic material, e.g. PU and a second layer 8b made of microporous material, e.g. microporous expanded PTFE, similar to the embodiments of FIGS. 1a and 1b. The laminate layer 8 further includes a third layer 8c of microporous material, e.g. microporous expanded PTFE, similar to the embodiment of FIG. 1b. The first layer 8a of hydrophilic material is sandwiched in between the second and third layers 8b, 8c. Also in this example, the first layer 8a may be attached to the second layer 8b and the third layer 8c, respectively, by any known lamination technique, e.g. as described in U.S. Pat. No. 4,194,041. In one embodiment the layer 8a can have a thickness of 12 µm, the layer 8b can have a thickness of 40 µm and the layer 8c can have a thickness of 40 µm.

Figure 1D:
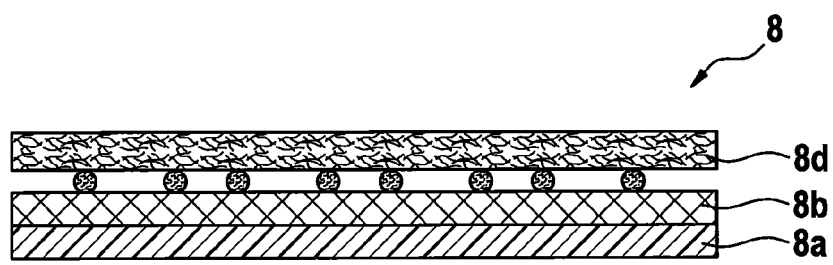
FIG. 1d shows a simplified and schematic cross sectional view of a further layer used to form an envelope in an embodiment.

A further alternative sheet like semipermeable layer 8 for forming the envelope 20 is shown in FIG. 1d. In this alternative the laminate layer 8 of FIG. 1b is attached to a textile layer 8d. In one example the laminate layer 8 is adhered with its ePFTE side 8b to a non-woven textile layer 8d.

Typically, at least the microporous layer provides for the semipermeable properties (water vapor permeable, gas impermeable) of the layer 8. The microporous layer is especially gas impermeable with respect to at least one of the gases produced by gas generating agent. Such microporous material usually will also have water proof characteristics. An example for such microporous material is expanded PTFE, as described in U.S. Pat. No. 3,953,566. In most cases also the hydrophilic layer may have gas impermeable characteristics, at least with respect to the gas produced by the gas generating agent, and typically also with respect to liquid water. Both the hydrophilic layer and the microporous layer(s) are permeable to water vapor, and hence breathable.

As used herein, any structure made up from hydrophilic and/or microporous layers being water vapor permeable, but at least temporarily gas impermeable as described and at least with respect to at least one of the gases produced by the gas generating agent, is referred to as a functional layer or functional structure.

In addition to the functional layer or functional structure as described, the layers 8 used with the invention may include further layers of breathable textile material, e.g. for purposes of support or protection of the functional layer or functional structure or for purposes of insulation.

Figure 2:
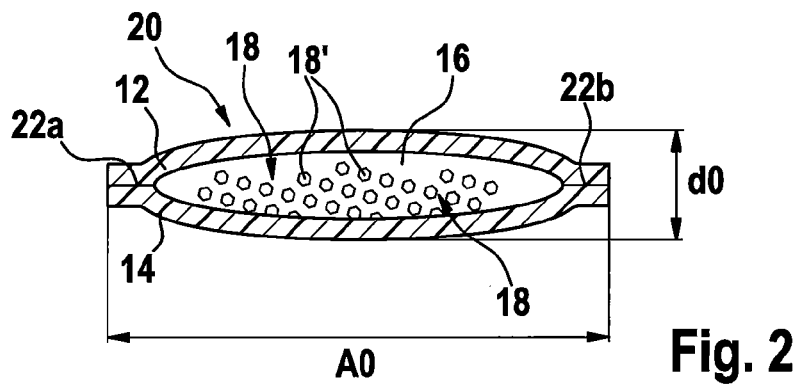
FIG. 2 shows a simplified and schematic cross sectional view of an envelope enclosing a cavity which includes a gas generating agent, according to an embodiment, the envelope being made from two envelope layers being bonded to each other such as to form the envelope.

FIG. 2 shows a simplified and schematic cross sectional view of an envelope (generally designated as 20) enclosing a cavity 16. The cavity 16 includes a gas generating agent (generally designated as 18). Such single envelope 20 may be the simplest form of a laminar structure 10 according to the invention. In FIG. 2, as well as in each of FIGS. 3a, 4a, 5a to 5c, the envelope 20 is shown in an unactivated configuration of the gas generating agent 18, and hence the envelope 20 has an uninflated, essentially flat configuration, also referred to as the unactivated condition. The dimension of the envelope 20 in thickness direction is designated in FIG. 2 by d0. The dimension in length direction is designated by A0 in FIG. 2, wherein A0 is the length across the cross section of the envelope 20 and between the ends of circumferential bonding portions 22a, 22b of the envelope seam. Dimension in width direction is orthogonal to the plane of projection and thus not designated. The length of the envelope 20 in width dimension is in these examples equal to A0. In other embodiments the dimension in width direction may be different from A0. In the unactivated condition the dimensions of the envelope 20 in length and width directions are much larger than the dimension of the envelope 20 in thickness direction d. Length direction and width direction define a lateral plane of the envelope 20 which is orthogonal to the thickness direction.

The envelope 20 is made of two envelope layers 12, 14. Envelope layers 12, 14 may each have a configuration as described above with respect to FIG. 1a, 1b, 1c, 1d or a similar configuration with monolithic or composite sheet like materials. Particularly, although not explicitly shown, the envelope layers 12, 14 may be each made up of composite structure with multiple sheets, e.g. as depicted in FIGS. 1b, 1c and 1d, and which are laminated onto each other. Said composite structure form a first part (in FIG. 2 the upper part) of the envelope 20, this first part enclosing a first part of cavity 16, and a second part (in FIG. 2 the lower part) of the envelope 20, this second part enclosing a second part of cavity 16, respectively. The envelope layer 12 enclosing the first part of the cavity 16 and the envelope layer 14 enclosing the second part of the cavity 16 may have an identical configuration, but this is not a necessary requirement. In some preferred embodiments, the first envelope layer 12 has a configuration different from the second envelope layer 14, for example the first envelope layer 12 may have a sheet like configuration and the second envelope layer 14 may have a semicircular configuration as shown for example in FIGS. 3a and 3b.

Furthermore, the first envelope layer 12 may be made from a material different from the material of the second envelope layer 14. In one embodiment the first envelope layer 12 is formed of a sheet like layer according to FIG. 1d and the second envelope layer 14 is form of a sheet like layer according to FIG. 1b, see e.g. FIGS. 3a and 3b.

The envelope 20 is formed by bonding together two envelope layers 12, 14 along a bonding portion 22a, 22b forming a closed loop. In such way, a cavity 16 is formed which is enclosed by the envelope 20. Envelope layers 12, 14 made of PU or envelope layers 12, 14 each comprising a PU layer exposed to the other envelope layer, can be used as bonding layers for welding or by melting of the PU material to form an adhesive. In case any of the envelope layer to be bonded with another envelope layer is made of other material not useable for welding or as an adhesive, e.g. made of ePTFE, bonding can be achieved by use of suitable adhesives, e.g. silicone adhesives.

Alternative materials may be used for making the envelope 20, as outlined above, given the materials themselves are semipermeable (water vapor permeable and gas impermeable with respect to at least one of the gases produced by gas generating agent 18). A further requirement is that the envelope layers 12, 14 may be bonded together sufficiently gas tight to make sure that gas remains included in the cavity 16 for sufficiently long time after activation of the gas generating agent 18.

The envelope 20 encloses a cavity 16 which comprises a gas generating agent 18. Gas generating agent 18 is chosen to be a powder defining at room temperature an unactivated configuration of it. In the unactivated configuration of the gas generating agent 18 as shown in FIG. 2, the gas generating agent 18 is substantially in a solid phase, in the form of small powder particles exemplary designated by 18a. When subject to heat, the gas generating agent 18 undergoes a phase transition or a chemical reaction. At least one of the products of the chemical reaction is a gas. In an embodiment the gas generating agent 18 may include sodium bicarbonate ("baking soda") $NaHCO_3$ which decomposes under heat with gaseous $CO_2$ being one of the decomposition products. See the description above for other systems suitable as gas generating agents.

Figure 3A:
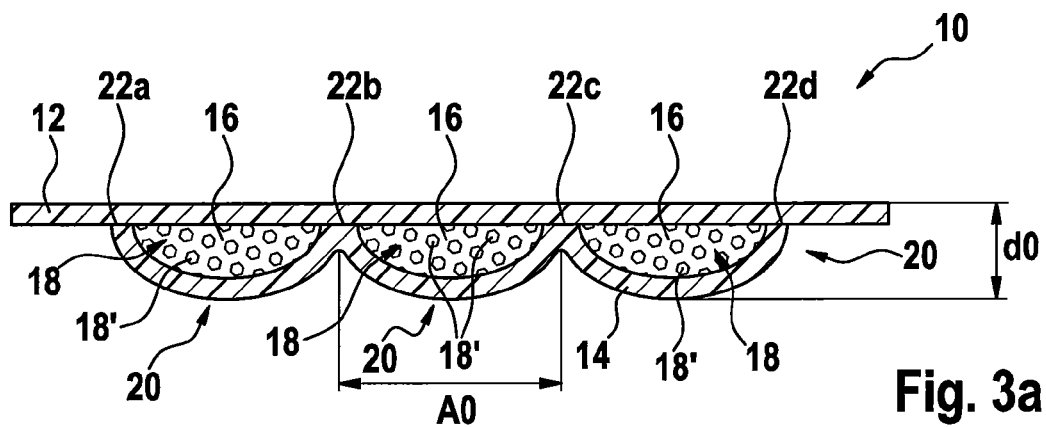
FIG. 3a shows a simplified and schematic cross sectional view of a laminar structure in an unactivated condition, the laminar structure including a plurality of envelopes formed by bonding together two envelope layers of sheet like material.

A laminar structure 10 including a plurality of envelopes 20 is shown in FIG. 3a. Said laminar structure 10 comprises a first envelope layer 12 and a second envelope layer 14. In this embodiment the envelope layers are made of different materials, as follows:

a) The first envelope layer 12 comprises a membrane structure including an ePTFE membrane and a hydrophyilic layer made of PU. The membrane structure is made according to U.S. Pat. No. 4,194,041. The membrane structure is adhered with its ePFTE side to a non-woven textile layer forming a sheet like two layer laminate (FIG. 1d). This first envelope layer 12 is essentially non-elastic or non-stretchable.

b) The second envelope layer 14 is a membrane structure including an ePFTE membrane and a hydrophyilic layer made of PU. The membrane is made according to U.S. Pat. No. 4,194,041. This second envelope layer 14 is essentially elastic or stretchable.

The envelope layers 12, 14 are bonded together via the PU layers. In a cross section, the laminar structure 10 has a configuration as shown in FIGS. 3a (unactivated condition) and 3b (activated condition).

A laminar structure 10 including a plurality of envelopes 20 as shown in FIG. 3a has been produced. Such laminar structure 10 has a configuration as shown exemplary in FIG. 8 and was used as a sample laminar structure to demonstrate functionality of the laminar structure. Said sample laminar structure 10 is 140 mm wide (W=140 mm) and 140 mm long (L=140 mm), and forms a quadrangular array of 16 quadrangular envelopes 20 (only some envelopes are exemplary designated by 20 in FIG. 8), each envelope 20 being 30 mm wide and 30 mm long (a=30 mm).

Figure 8:
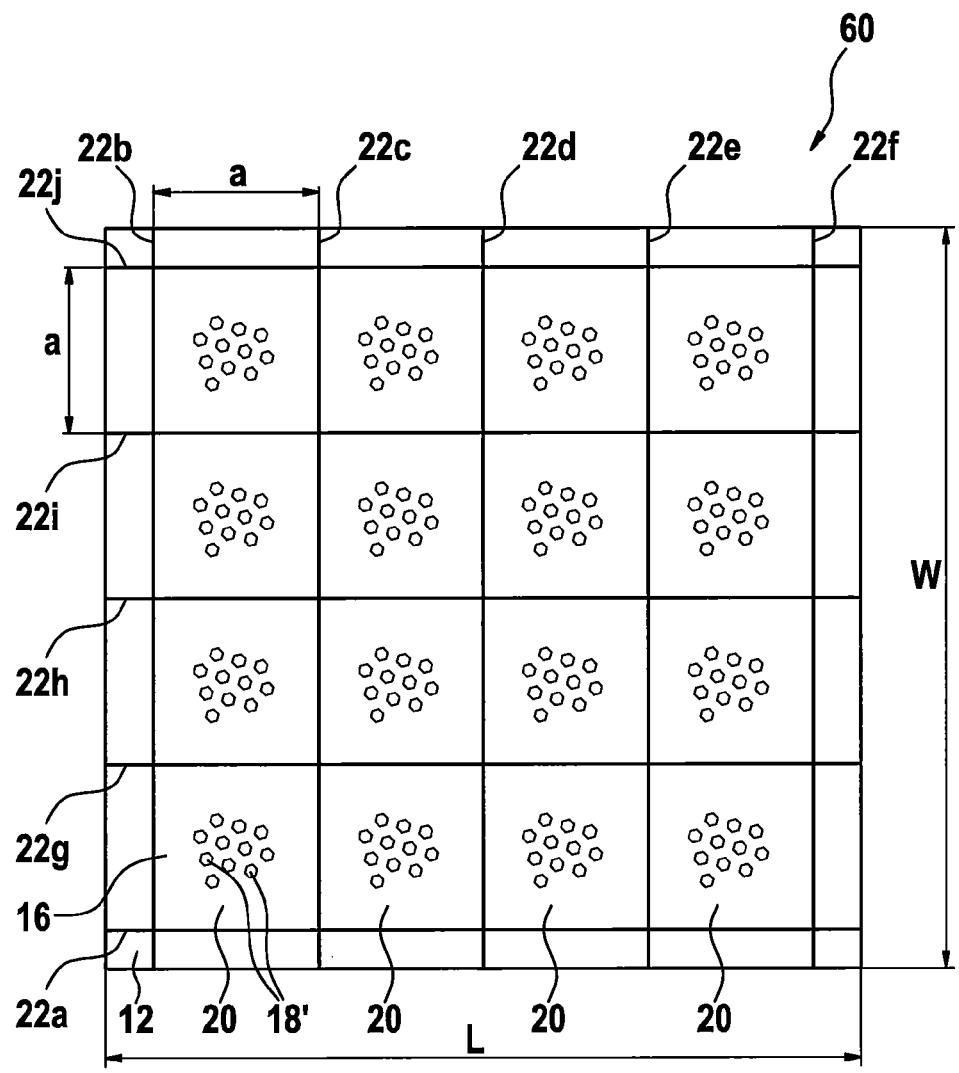
FIG. 8 shows a schematic sketch of a laminar structure test piece for measuring the increase in distance between the first layer and the second layer when the laminar structure is being brought from the unactivated condition into the activated condition.

The above described sample laminar structure 10 has been produced in the form of test piece 60 as follows:

First Sealing Step:

Two envelope layers 12, 14, each being 140 mm wide and 140 mm long are laid on top of each other with the hydrophilic layers facing each other. In the example of FIG. 8 each envelope layer 12, 14 is in the form of a laminate comprising a hydrophilic layer (e.g. PU layer) exposed on at least one side thereof (see e.g. the envelope layers 8 shown in FIGS. 1b and 1d), and thereby the layers 12, 14 can be bonded together by welding of the PU material. For other configurations, other suitable bonding techniques may be used. A hot bar (sealing width: 2 mm) is brought into contact with the envelope layers 12, 14 such as to bring the hydrophilic layers into contact and to weld the hydrophilic layers together along one of the sides of the quadrangle. Thereby a first linear bonding portion 22a is formed.

Second Sealing Step

The hot bar is brought into contact with the envelope layers 12, 14 to weld the laminates together along five linear bonding portions 22b, 22c, 22d, 22e, 22f extending rectangular to the first linear bonding portion 22a. The five parallel bonding portions 22b, 22c, 22d, 22e, 22f each have a distance of 30 mm from each other. Linear bonding portion 22d extends in the middle of the 140 mm wide laminar structure 10. In this way, four elongate pockets or cavities are produced.

First Filling Step

In order to fill gas generating agent 18 in the form of a powder (particles of the powder being designated by 18' in FIG. 8) into the elongate pockets, the laminar structure is hold upright with the open side on top to enable the powder 18a to drop down to the bottom of the elongate pockets. A predetermined amount of gas generating agent 18, as required for one of the cavities 16, is filled into each of the four elongate pockets from the open side. The amount of gas generating agent 18 to be filled into each elongate pocket depends on the final size of each cavity 16. For the sample laminar structure 10 of FIG. 8 each of the envelopes 20 is 30 mm wide and 30 mm long, and a powder made from sodium bicarbonate is used as gas generating agent 18. The amount of gas generating agent 18 to be filled in is about 0.3 g/per cavity.

Third Sealing Step:

Using the hot bar, a seventh linear bonding portion 22g is created which extends parallel to the first linear bonding portion 22a at a distance of 30 mm from the first linear bonding portion 22a. Thereby four envelopes 20 in a first row are produced each enclosing a respective cavity 16 (in FIG. 8 only one of these cavities is designated by 16).

The first filling step is repeated for each of the four remaining elongate pockets open on the upper side. Then the third sealing step is repeated to create an eighth linear bonding portion 22h which extends parallel to the first and seventh linear bonding portions 22a, 22g at a distance of 30 mm from the seventh linear bonding portion 22g. Thereby further four envelopes 20 in a second row are produced each enclosing a respective cavity 16.

The first filling step and the third sealing step are repeated twice, in order to create two further bonding portions 22i,22j to complete the sample laminar structure 10 with in total 16 envelopes 20 each encloses a respective cavity having filled therein 0.3 g of gas generating agent 18.

Figure 3B:
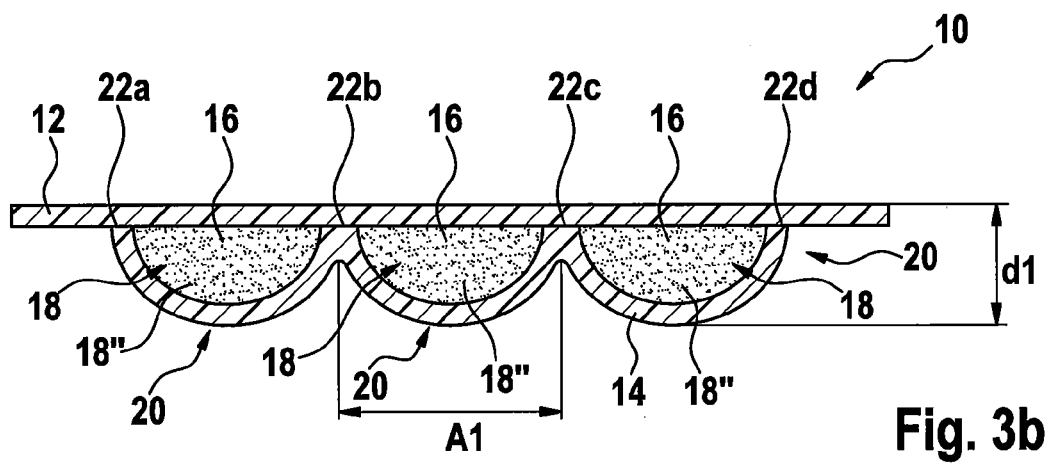
FIG. 3b shows a simplified and schematic cross sectional view of the laminar structure of FIG. 3a in an activated condition.

The functionality of a laminar structure 10 including of one or a plurality of envelope 20 in an activation cycle is demonstrated in FIGS. 3a and 3b. FIG. 3a shows the laminar structure 10 in an unactivated condition with the gas generating agent 18 in the solid phase (indicated by 18'). FIG. 3b shows the laminar structure in an activated condition, i.e. after the gas generating agent 18 has been evaporated into its gaseous phase (indicated by 18"). It can be seen by comparing FIGS. 3a and 3b that the shape of the envelopes 20 has changed from a relatively flat shape with only small thickness d0 (corresponding to the distance d0 between the outer surfaces of first envelope layer 12 and second envelope layer 14) in the unactivated condition to a concave shape with much larger thickness (corresponding to distance d1 in FIG. 3b) in the activated condition.

As the first envelope layer 12 is made of essentially non-elastic or non-stretchable material, but the second envelope layer 14 is made of essentially elastic or stretchable material, only the material of the second envelope layer 14 elongates in at least one direction in response to activation of the gas generating agent 18. Thereby, in response to increasing pressure in the cavity 16 upon activation of the gas generating agent 18, the shape of the envelopes 20 changes in such a way that the first envelope layer 12 remains stable in an essentially unchanged configuration, but an expansion of the second envelope layer 14 takes place. Stability of the first envelope layer 12 ensures that any fabrics produced with the laminar structure 10 will remain in shape under exposure to heat.

In the embodiment of FIGS. 3a and 3b both the first and second envelope layers 12, 14 are laminate layers which are bonded to each other by bonding regions 22a, 22b, 22c, 22d in a regular, grid like pattern, such as to form a plurality of envelopes 20, as described. Thereby each two adjacent envelopes share at least one bonding portion 22b, 22c which separates the respective two adjacent cavities. Therefore no gaps remain in between adjacent envelopes 20. Still the laminar structure remains to be breathable, because each of the envelopes 20 is made from water vapor permeable material.

FIGS. 3a and 3b further show that in case the first layer 12 and/or the second layer 14 have a structure with embossments and depressions, it may be convenient to measure the distances d0 and d1 with respect to reference planes of the first and second layers 12, 14 respectively. In the example shown, the distances d0 and d1 are measured using reference planes touching the most distant points of the first and second layers 12, 14 respectively.

FIGS. 4a to 4c show in simplified and schematic cross-sectional views a laminar structure 10 according to a further embodiment in an unactivated condition (FIG. 4a), as well as in a first stage (FIG. 4b) and in a second stage (FIG. 4c) of an activated condition. The embodiment of FIGS. 4a to 4c comprises a plurality of envelopes 20 (for purposes of convenient description the envelopes are designated by reference signs 20a-20e). Each of the envelopes 20a-20e is made from two envelope layers 12, 14 which are bonded together along bonding portions 22a, 22b, 22c, 22d, 22e, 22f in a grid like pattern in a plan view, as described, such that each two adjacent envelopes 20a-20e share at least one common bonding portion 22b-22e. Gas generating agent 18 is shown in powder form (designated by 18a in FIG. 4a), but may be any of the substances or chemical systems described above.

Upon activation of the gas generating agent 18 with evaporation of at least a significant part of the gas generating agent (in FIGS. 4b and 4c gaseous particles of gas generating agent are designated by 18"), gas pressure in cavities 16a-16e increases, and the envelopes 20a-20e become inflated, as shown in FIG. 4b. In FIG. 4b inflation has reached a stage where the distance d1 between the first layer 12 and second layer 14 has increased significantly with respect to the distance d0 in unactivated condition (see FIG. 4a). However, the number of envelopes 20a-20e and the number of corresponding cavities 16a-16e is still the same as in the unactivated condition of FIG. 4a.

FIG. 4c shows a further progressed stage of the activated condition of the laminar structure 10. In the stage of FIG. 4c, a number of bonding portions 22c, 22d separating adjacent envelopes 20b and 20c as well 20c and 20d, respectively, have been broken at least in part under gas pressure in the respective cavities 16b, 16c, 16d. As a result the formerly separated cavities 16b, 16c, 16d became unified to a single "macro-cavity" 26 in the stage shown in FIG. 4c.

Such unification of a plurality of separated cavities 16 at a predetermined stage of activation of the laminar structure 10 is considered of advantage, because cavities 16 having larger volume are more efficient in increasing the distance between the first layer 12 and the second layer 14 than cavities 16 with smaller volume. For this reason, with respect to achieve efficient increase in thermal insulation upon activation, it is advantageous to provide large cavities. After the activation, the envelopes might combine under gas pressure to form larger "macro-cavities" which allows further increased efficient thermal insulation capability.

The bonding portions 22a-22f of the envelopes 20a-20e which separate adjacent cavities 16a-16e from each other may even be designed in such a way to be somewhat weaker at predetermined portions thereof, such as to provide well defined breaking points upon a desired stage of activation in response to a respective increase in pressure inside the cavities 16.

In the embodiment of FIG. 4a-4c the first envelope layer 12 and the second envelope layer 14 are both made of a stretchable material, and hence are able to change shape under gas pressure inside the cavity. However, a structure as shown in FIGS. 4a-4c with macro-cavities being formed when gas pressure inside the cavities increases beyond a threshold, may also be realized using a laminar structure 10 comprising a first envelope layer 12 and a second envelope layer 14 made of different materials, in particular using a laminar structure 10 comprising a first envelope layer 12 of non-stretchable material and a second envelope layer of stretchable material, as shown in FIGS. 3a and 3b.

Figure 5A:
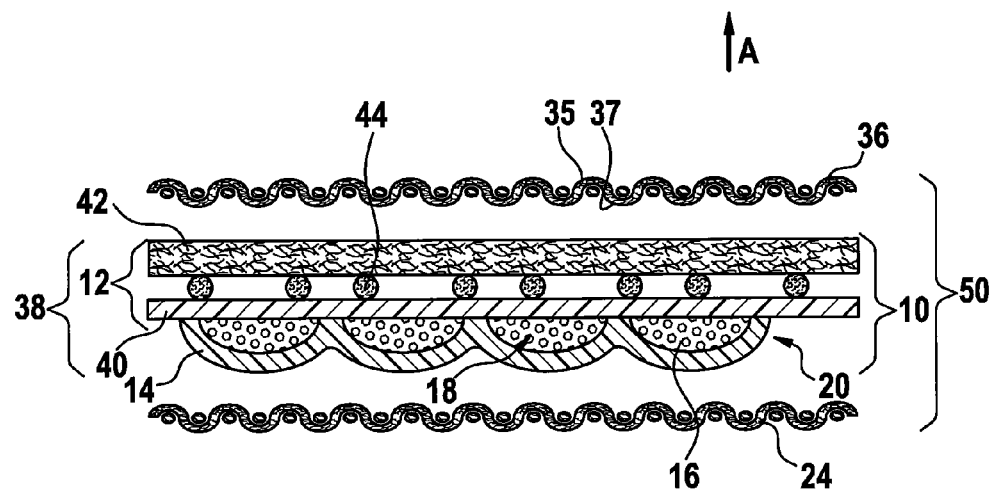
FIG. 5a shows a simplified and schematic cross sectional view of a fabric including a laminar structure providing adaptive thermal insulation according to an embodiment of the invention.
Figure 5B:
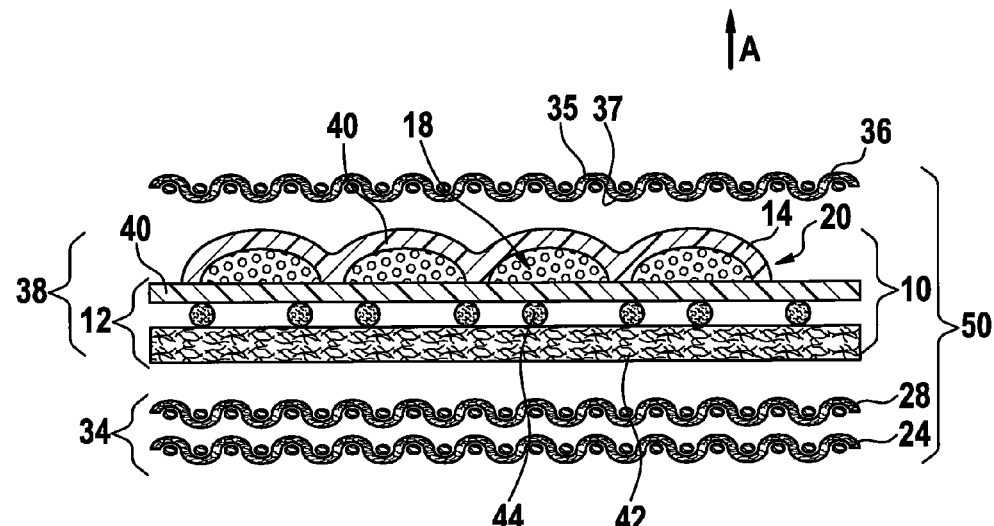
FIGS. 5b and 5c show other possible configurations of a fabric including the laminar structure providing adaptive thermal insulation according to further embodiments of the invention.
Figure 5C:
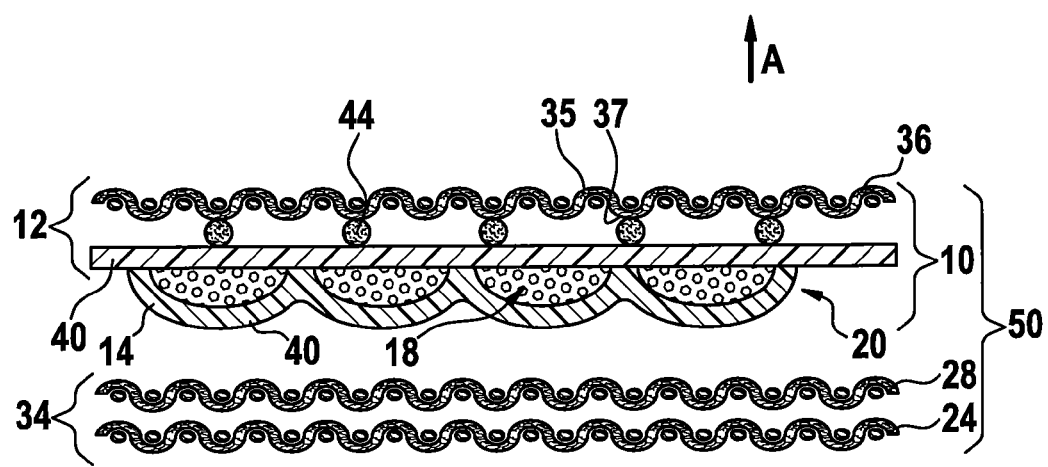

FIGS. 5a-5c show a simplified and schematic cross-sectional view of fabric composites 50 including a laminar structure 10 according to the invention. The fabric composites 50 comprise a plurality of layers arranged to each other.

An outer side A means for all embodiments in the FIGS. 5a to 5c said side of a garment made with such fabric composite 50 which is directed to the environment.

In the embodiment of FIG. 5a the following layers are arranged on top of each other, seen from the outer side A of a garment made with such fabric composite 50:

(1) an outer heat protective shell layer 36 having an outer side 35 and an inner side 37;

(2) a laminar structure 10 providing adaptive thermal insulation, as described above arranged on the inner side 37 of the outer heat protective shell structure 36;

(3) an insulating textile layer 24 positioned on the inner side of the fabric structure 50.

The outer heat protective shell layer 36 is made of woven textile with a textile weight of 200 g/m² using fibers available under the name Nomex Delta T, the textile is being available e.g from the company Fritsche Germany.

The laminar structure 10 includes a first envelope layer 12 arranged on the outer side, i.e. facing towards the outer heat protective shell layer 36, and a second envelope layer 14 arranged on the inner side, i.e. facing towards the insulating textile structure 24. The first envelope layer 12 adhesively attached to the inner side of a textile layer 42 for example by adhesive dots 44. Layer 42 may be a woven or non-woven textile layer. Both the first envelope layer 12 and the second envelope layer 14 of the laminar structure 10 may, but do not need necessarily, include functional layers.

The first envelope layer 12 comprises a membrane structure 40 including an ePTFE membrane and a hydrophyilic layer made of PU. The membrane structure 40 is made according to U.S. Pat. No. 4,194,041. The membrane structure 40 is adhesively attached (for example by adhesive dots 44) with its ePFTE side to a non-woven aramide textile layer 42 forming a sheet like two layer laminate (FIG. 1d). The textile layer 42 is made of 15% para-aramide fibers and 85% meta-aramide fibers with a textile weight of 90 g/m². This first envelope layer 12 is essentially non-elastic or non-stretchable.

The second envelope layer 14 is a membrane structure including an ePFTE membrane and a hydrophyilic layer made of PU. The membrane is made according to U.S. Pat. No. 4,194,041. This second envelope layer 14 is essentially elastic or stretchable.

The envelopes 20 of the laminar structure 10 are formed by carrying out several sealing steps as described with respect to FIG. 3a.

The first envelope layer 12 is made of substantially non-elastic or non-stretchable material, and therefore stably adheres to the textile layer 42 even in an activated condition.

The innermost woven textile layer 24 has a textile weight of 135 g/m² and is made of Nomex/viscose (available from company Fritsche, Germany). The innermost woven textile layer 24 faces the wearer's skin in case the fabric composite 50 is used to manufacture garment.

In the fabric of FIG. 5a the laminar structure 10 includes the first envelope layer 12 which includes a functional layer and the second envelope layer 14 which also includes a functional layer. Hence, the laminar structure 10 itself has the functionality of a barrier structure 38. In the embodiment of FIG. 5a the first envelope layer 12 made of substantially non-stretchable or non-elastic material is facing towards the outer heat protective shell layer 36, while the second envelope layer 14 made of substantially stretchable or elastic material is facing towards the insulating textile structure 24. Therefore, activation of the gas generating agent 18 results in inflation of the cavities 16 of the laminar structure 10 substantially towards the inner side, i.e. towards the wearer's skin.

In the fabric of FIG. 5a the laminar structure 10 providing adaptive thermal insulation is positioned inside the outer shell 36 and outside the insulating textile structure 24. The outer shell 36 has fire resistant and insulating properties, and therefore provides a shielding to the laminar structure 10 with respect to the source of heat. Hence, the laminar structure 10 is expected to experience much lower temperatures than existing at the outer shell 36 of the garment. This has a benefit in that the temperature resistance of the materials used for the laminar structure 10 need not be as high as it would be required for material positioned close to the outer shell 36. However, the adaptive thermal insulating structure must be able to respond (i.e. to become activated) at relatively moderate temperature increase. Most importantly, such response must be precisely adjusted, in order to avoid unnecessary activation at only moderately increased temperatures, on the one hand, and in order to avoid a catastrophic failure to activation in cases of only slightly stronger increase in temperature than anticipated for an activating event. It has been shown that a relatively precisely controllable adaptive thermal insulation mechanism can be implemented using the laminar structure 10 with first layer 12, second layer 14 and cavity 16 filled with a gas generating agent 18 according to the invention.

Other exemplary configurations of fabrics 50 to which the laminar structure 10 can be applied are shown in FIGS. 5b and 5c:

In the fabric 50 of FIG. 5b the laminar structure 10 has the same structure as described in FIG. 5a. The laminar structure 10 is arranged in the fabric in the opposite way than in FIG. 5a. The second envelope layer 14 faces the inner side 37 of the outer shell 36 and the first envelope layer 12 is directed to the innermost textile layers 28 and 24.

The outer heat protective shell layer 36 is made of woven textile with a textile weight of 200 g/m² using fibers available under the name Nomex Delta T, the textile is being available e.g from the company Fritsche, Germany.

The textile layers 28 and 24 form an insulating textile structure 34. Said insulating textile structure 34 is made of one layer 28 of 55 g/m² spunlace (available as Vilene Fireblocker from company Freudenberg) quilted together to an innermost liner 24 made of 135 g/m² Nomex/viscose woven (available from company Fritsche). The innermost liner 24 faces the wearer's skin in case the fabric composite 50 is used to manufacture a garment.

The laminar structure 10 is positioned in between the outer heat protective shell layer 36 and the insulating textile structure 34. In the embodiment of FIG. 5b the first envelope layer 12 made of substantially non-elastic or non-stretchable material is facing towards the insulating textile structure 34, while the second envelope layer 14 made of substantially elastic or stretchable material is facing towards the outer heat protective shell layer 36. Therefore, activation of the gas generating agent 18 results in inflation of the cavities 16 of the laminar structure 10 substantially towards the outer side A.

In FIG. 5c the laminar structure 10 includes a first (outer) envelope layer 12 and a second (inner) envelope layer 14. The second envelope layer 14 is a membrane structure 40 including an ePFTE membrane and a hydrophyilic layer made of PU. The membrane is made according to U.S. Pat. No. 4,194,041. This second envelope layer 14 is essentially elastic or stretchable. The first envelope layer 12 comprises a membrane structure 40 including an ePTFE membrane and a hydrophyilic layer made of PU. The membrane structure 40 is made according to U.S. Pat. No. 4,194,041. The membrane structure 40 is adhesively attached (for example by adhesive dots 44) with its ePFTE side to the outer heat protective shell layer 36 forming the first envelope layer 12.

The outer heat protective shell layer 36 is made of woven textile with a textile weight of 200 g/m² using fibers available under the name Nomex Delta T, the textile is being available e.g from the company Fritsche, Germany.

An insulating textile structure 34 including layers 28, 24 similar to the embodiment of FIG. 5b is provided to the second envelope layer 14 of the laminar structure 10.

The laminar structure 10 of this embodiment forms the outer layer of the fabric 50 and the envelopes 20 are positioned in between the outer heat protective shell layer 36 and the insulating textile structure 34. The first envelope layer 12 is made of substantially non-elastic or non-stretchable material. The second envelope layer 14 is made of substantially elastic or stretchable material and is facing towards the insulating textile structure 34.

Figure 6:
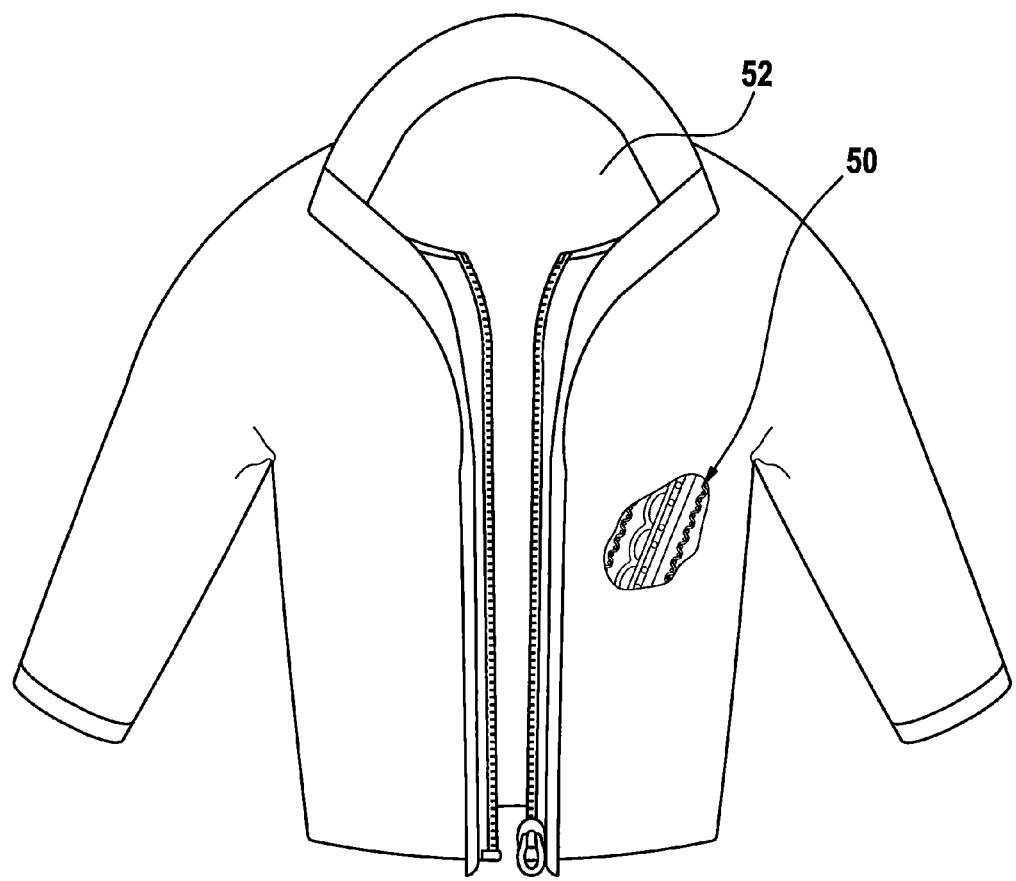

FIG. 6 shows a fire fighter's jacket 52 including fabric composite 50 as shown in FIGS. 5a-5c. Other garments which may comprise fabrics 50 according to invention include jackets, coats, trousers, overalls, gloves, socks, gaiters and headgear. The inventive laminar structure may also be incorporated in shoes, blankets, tents and the like or parts of them.

Figure 7:
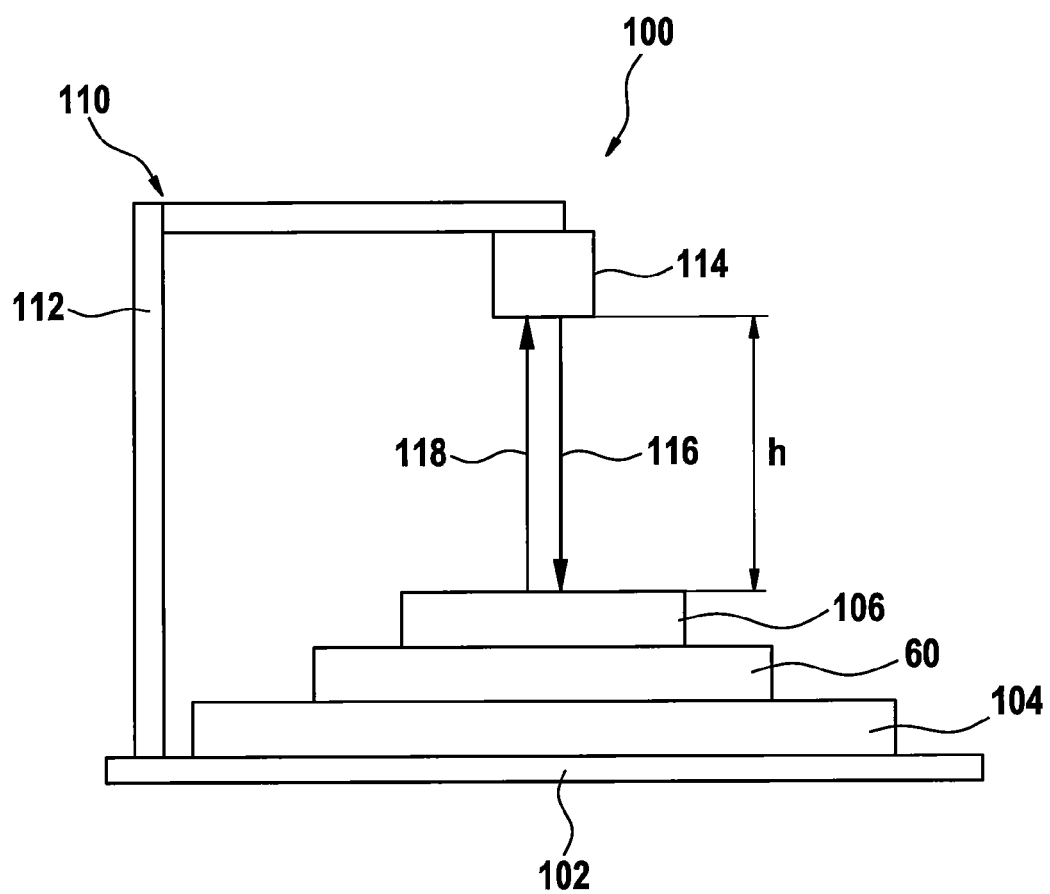
FIG. 7 shows a schematic sketch of an apparatus to measure increase in distance between the first layer and the second layer when the laminar structure is being brought from the unactivated condition into the activated condition.

FIG. 7 shows a schematic sketch of an apparatus 100 to measure increase in distance d between the first layer 12 and the second layer 14 when the laminar structure is being brought from the unactivated condition into the activated condition. In this context it is referred to FIG. 8 showing a schematic sketch of a sample laminar structure 10 to be used as a test piece 60 with the apparatus of FIG. 7 for measuring the increase in distance d between the first layer 12 and the second layer 14 when the laminar structure 10 is being brought from the unactivated condition into the activated condition. The test piece 60 is shown in plan view in FIG. 8. A cross sectional view thereof corresponds to the cross sections shown in FIGS. 3a and 3b. FIG. 8 shows the test piece 60 in the unactivated condition.

A method for measuring thickness change of such test piece is as follows:

Setup of Measurement Apparatus:

The arrangement 100 for measuring a thickness change of the test piece 60 in response to a change in temperature is shown in FIG. 7. The arrangement comprises a base 102, a heating plate 104, a top plate 106, and a laser based distance measuring device 114.

Heating plate 104 is connected to a heating apparatus (plate 300 mm×500 mm out of a Erichsen, doctor blade coater 509/MC/1+heating control Jumo Matec, with controler Jumo dtron16, connected to 220V/16A)

Test piece 60 is laid flat on the heating plate.

Top plate 106 has the form of a flat disk with a diameter of 89 mm and is made of "Monolux 500" (available from Cape Boards Et Panels, Ltd., Uxbridge, England) or an equivalent material. Top plate 106 has a weight of approx 115 g. Top plate 106 is laid flat on test piece 10.

Laser based distance measuring device 110 includes a frame 112 and a distance laser device 114 (laser sensor: Leuze ODSL-8N 4-400-S 12 which is connected to a A/D converter Almemo 2590-9V5 having a reading rate of 3 measurements per second, the A/D converter translates the 0-10 V output of the laser sensor into a 0-400 mm distance reading, accuracy: 0.2 mm on a plain plate). The frame 112 is mounted to the base 102 and is mounted to a top arm of the distance laser device 114. The distance laser device 114 emits a laser beam 116 towards the top surface of the top plate 106 and receives a reflected beam 118. The distance laser device 114 is able to detect a distance h between the distance laser device 114 and the top surface of top plate 106. Preferably, laser beam 116 is emitted orthogonally to top surface of top plate 106.

The temperature gradient of plate 104 is lower than 2K across the plate in the range of the measurement.

First Measurement Procedure (Thickness Reversibility Method):

For such thickness reversibility test, a test piece 60 being able to undergo multiple activation/deactivation was used, e.g. a test piece 60 having a configuration as shown in plan view in FIG. 8 and in cross sectional view in FIGS. 3a and 3b with ammonium carbonate $(NH_4)_2CO_3$ as gas generating agent.

First measurement procedure was done at room temperature, i.e. controlled climate of 23° C. and 65% relative humidity.

Set-up of thickness measurement apparatus, as described above, was used.

(a) Top plate 106 was placed directly onto heating plate 104 (without test piece) to obtain a zero reading h_0.

(b) Then, test piece 60 was placed in between heating plate 104 and top plate 106. Heating plate 104 is heated to a temperature above ambient temparature and 5K below the expected activation temperature of the gas generating agent to obtain an initial height reading h_1. Thickness of test piece 60 (corresponding to distance between first layer 12 and second layer 14 in unactivated condition) d0=h_0−h_1.

(c) Heating cycle:

Target temperature of heating plate 104 was set to a temperature 30° C. above the activation temperature of the gas generating agent in the envelope 20 and heating plate 104 was heated with a heating rate of 1 K/min. Increase in thickness (corresponding to increase in distance d between first layer 12 and second layer 14) was measured by distance laser device 114 every 10 s. When heating plate 104 reached target temperature this temperature was maintained for about 10 min and reading of increase in thickness was continued. After 10 min final increase in thickness was measured (corresponding to distance between first layer 12 and second layer 14 in activated condition of gas generating agent)

(d) Cooling cycle:

Target temperature of heating plate 102 was set to room temperature and heating plate 102 was cooling down by the environment within 1 hour. Decrease in thickness (corresponding to decrease in distance d between first layer 12 and second layer 14) was measured by distance laser device 114 every 10 s. When heating plate 104 reached target temperature this temperature was maintained for about 10 min and reading of decrease in thickness was continued. After 10 min final decrease in thickness was measured (corresponding to distance between first layer 12 and second layer 14 in unactivated configuration)

Heating cycle (c) and cooling cycle (d) were repeated 3 times. Each time thickness increase at topmost temperature and thickness decrease at lowermost temperature were measured.

Figure 9:
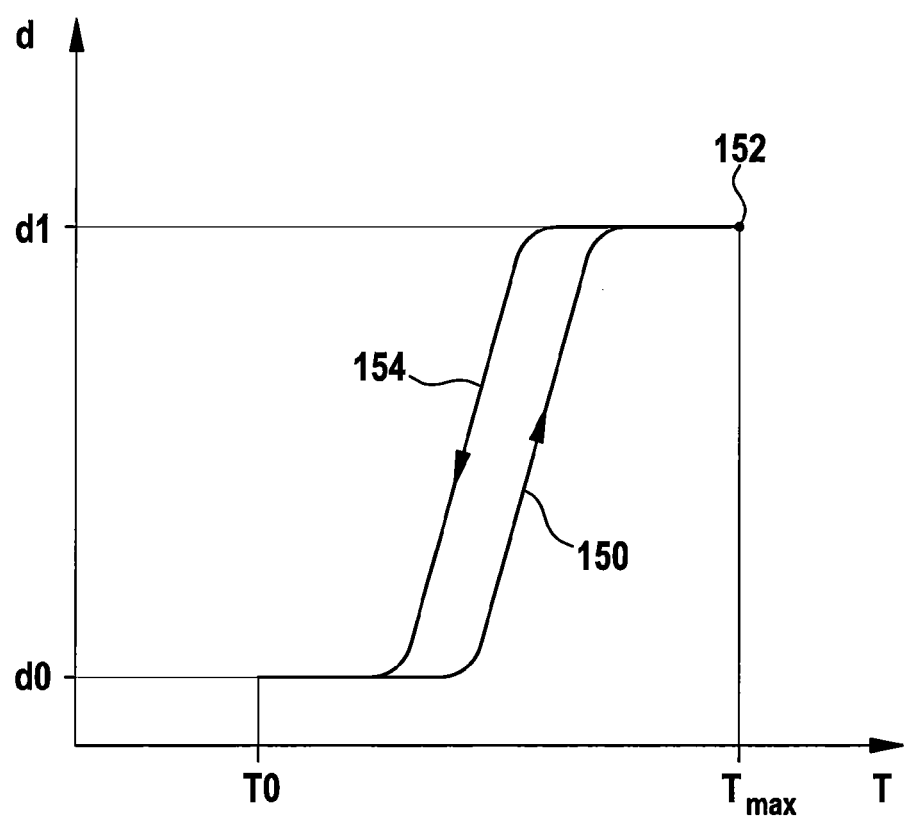
FIG. 9 shows schematically the result of a first functionality test for a laminar structure configured to reversibly undergo a plurality of activation/deactivation cycles.

FIG. 9 shows schematically a result of the thickness reversibility test for one heating cycle and one cooling cycle in the form of a distance d vs. temperature T diagram. It can be seen in FIG. 9 that a hysteresis loop was produced. Starting from temperature T0/distance d0 distance d increased following curve 150, until an upper plateau 152 was reached. When temperature T decreased again, distance d followed another curve 154, until first distance d0 was reached again. From the upper plateau 152 of this hysteresis loop the distance d1 between the first layer 12 and second layer 14 in the activated configuration, and from the lowermost plateau distance d0 between the first layer 12 and second layer 14 in the unactivated configuration can be inferred.

Second Measurement Procedure (Increase in Thickness with Respect to Time for Given Temperature):

The second measurement procedure was done with a test piece 60 having a configuration as shown in plan view in FIG. 8 and in cross sectional view in FIGS. 3a and 3b. A powder made from sodium bicarbonate ($NaHCO_3$, "baking soda") was used as gas generating agent 18. The amount of gas generating agent 18 filled into the envelopes 20 was about 0.3 g/per envelope.

Test piece 60 was subject to a source of heat with fixed temperature, and change in thickness of test piece 60 over time was detected.

Test was done at room temperature, i.e. controlled climate of 23° C. and 65% relative humidity.

Set-up of thickness measurement apparatus, as described above, with a heating plate of type VHP C7-2 obtainable from www.vwr.com was used.

(a) Heating plate 104 was held at room temperature. Top plate 106 was placed directly onto heating plate 104 (without test piece) and a zero height reading h_0 was obtained.

(b) Then the heating plate 104 was heated to up to a temperature of 250° C., and detection of height reading h over time was started. Height readings were obtained with high temporal resolution in order to determine thickness change of test piece 60 with time. Heating plate 104 was held at a temperature of 250° C. throughout the test.

(c) Test piece 60 together with top plate 106 positioned on top of the test piece 60 was put onto heating plate 104. A first height reading h_1 was obtained immediately to obtain initial thickness d0 of test piece 60 (corresponding to distance between first layer 12 and second layer 14 in unactivated condition) d0=h_0–h_1, see point A in FIG. 10 which shows schematically the change of thickness d of the test piece 60 vs. time t lapsed after start of heating of heating plate 104. At time t0, test piece 60 was put onto heating plate 104 (which was at temperature of 250° C.), and thickness d0 was determined.

Figure 10:
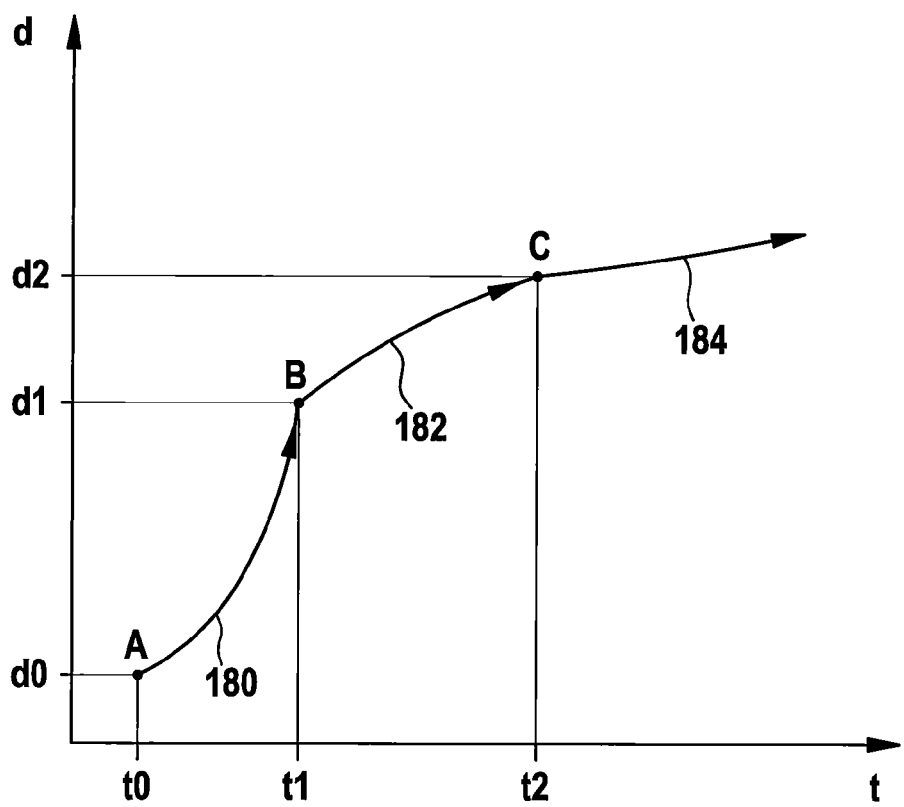
FIG. 10 shows schematically the result of a second functionality test for a laminar structure being exposed to increased temperature, as a function of time during activation.

(d) Since the heating plate 104 was already at a temperature of 250° C., the gas generating agent 18 changed its configuration quickly into the gaseous phase, and thus thickness d of the test piece 60 increased fast, as indicated by curve section 180 between points A and B in FIG. 10. At time t1, the thickness vs. time curve reached point B in FIG. 10. Height reading h_B at point B was obtained. Point B corresponds to a first stage of the activated condition where the envelopes 20 were expanded significantly without being ruptured. As shown in FIG. 10, the first stage of the activated condition was reached at time t1 and thickness of test piece 60 was d1.

Thickness of test piece 60 in first stage of activated condition (corresponding to distance between first layer 12 and second layer 14 in first stage of activated condition): D1=h_0–h_B.

Increase in thickness of test piece 60 (corresponding to increase in distance between first layer 12 and second layer 14 in first stage of activated condition with respect to unactivated condition) d1−d0=h_1−h_B.

Subsequent to time t1, the steep increase of the thickness vs. time curve slowed down significantly. Therefore a change in slope of the thickness vs. time curve was observed at time t1, corresponding to point B in FIG. 10. It was observed that the envelopes 20, although having expanded rapidly in curve section 180, still remained intact at time t1.

(e) Following time t1, thickness d of test piece still 60 increased with time, but with lower slope, see curve section 182 between points B and C in FIG. 10. Slowing down of the increase in thickness of the test piece 60 is assumed to be due at least one of the following two effects: (i) gas generating agent 18 has undergone conversion into the activated configuration completely, and therefore the amount of gas in the cavities does not increase any more, but pressure in the cavities only increases according to expansion of gas with temperature; (ii) the cavities have changed shape such as to optimize volume for given surface area (i.e. towards a spherical shape), and therefore further expansion is only possible as fast as the material of the outer envelopes stretches under gas pressure.

(f) A further slowing down of the increase in thickness d of the test piece 60 with time was observed at time t2, see point C and curve section 184 subsequent to time t2 in FIG. 10. At time t2 it was observed that inner bonding portions 22c, 22d, 22e, 22g, 22h, 22i separating the envelopes 20 broke under gas pressure inside cavities 16 (outer bonding portions 22a, 27b, 22f, 22j in this test piece 60 were configured stronger than inner bonding portions, and thus remained intact). Thus a macro-cavity was formed by combining cavities 16 to a single macro-cavity (similar to the process described above with respect to FIGS. 4a-4c). The slowing down of the increase in thickness d with time in curve section 184 following formation of the macro-cavity at time t2 is attributed to the larger volume of the macro-cavity. Formation of the macro-cavity indicates that the further progressed stage of the activated condition described with respect to FIG. 4c has been reached. Subsequent to time t2, corresponding to point C in FIG. 10, the increase in thickness of test piece 60 continued, as shown in curve section 184, until all thermal energy provided by heating plate 104 was converted into a pressure difference between inside the macro-cavity and outside the macro-cavity.

In further tests done with other test pieces having a configuration as described, but in which all bonding portions 22a-22j were configured similarly strong, it was observed that formation of a macro-cavity, as described above, was less pronounced, since not all cavities combined to one single macro-cavity within a short time around t2. Rather, in such embodiments the bonding portions 22a-22j between the envelopes 20 ruptured one after the other over an extended time period, and finally even all bonding portions were broken. In such embodiments the decrease in slope at point C is much less pronounced.

Example of a Fabric Structure:

A fabric sample structure 50 as shown in FIG. 5a, said sample fabric structure 50 including a laminar structure 10 as shown in FIGS. 8 and 3a has been build up having 16 envelopes 20, as described above to form example 1. As reference example the same set-up has been used without filling the envelopes 20 with gas generating agent 18.

The following test results were obtained:

|  | Example 1 | Reference example |
| --- | --- | --- |
| EN367-HTI24-mean [s] | 26.4 | 20.4 |
| weight per area [g/m$^2$] | 537 | 553 |
| RET [m$^2$ Pa/W] | 18 | 18 |

"EN367-HTI24-mean" refers to "heat transfer index at 80 W/m$^2$", as defined in EN 367 (1992). This quantity measures the time it takes to obtain an increase of 24 K in temperature at the second side (inner side) of a sample fabric as shown in FIG. 8 when the first side is subject to a heat source of 80 W/m$^2$.
RET refers to water vapor transmission resistance, as defined above.

The invention claimed is:

1. A laminar structure providing adaptive thermal insulation, comprising:
   a first layer,
   a second layer,
   at least one cavity in between the first layer and the second layer, each said cavity being enclosed by a semipermeable envelope, and
   a gas generating agent having an unactivated configuration and an activated configuration, the gas generating agent being adapted to change from the unactivated configuration to the activated configuration in response to an increase in temperature in the cavity,
   wherein said change from said unactivated configuration to said active configuration results in an increase of gas pressure inside said at least one cavity,
   wherein the first layer, the second layer, and the at least one cavity are arranged such that a distance between the first layer and the second layer increases in response to the increase in gas pressure inside the at least one cavity; and
   wherein the semipermeable envelope is made of at least two envelope layers of water vapor permeable and at least temporarily as impermeable material, the at least two envelope layers being bonded together.

2. The laminar structure according to claim 1, wherein gas generating agent generates gas in the cavity in response to a temperature in the cavity exceeding a predetermined activation temperature, wherein a first distance between the first layer and the second layer in the unactivated configuration of the gas generating agent increases to a second distance between the first layer and the second layer in the activated configuration of the gas generating agent.

3. The laminar structure according to claim 1, wherein the second distance is greater than the first distance by 1 mm or more.

4. The laminar structure according to claim 1, wherein the semipermeable envelope includes a hydrophilic material.

5. The laminar structure according to claim 4, wherein the semipermeable envelope includes polyurethanes or polyesters.

6. The laminar structure according to claim 1, wherein the semipermeable envelope is made at least partially of a stretchable material.

7. The laminar structure according to claim 1, wherein the envelope comprises a first envelope layer of water vapor permeable and at least temporarily gas impermeable, non-stretchable material, and a second envelope layer of water vapor permeable and at least temporarily gas impermeable, stretchable material.

8. The laminar structure according claim 1, wherein the envelope is made of a temperature resistant material with respect to a range of temperatures in the cavity in the activated configuration of the gas generating agent.

9. The laminar structure according to claim 1, wherein the gas generating agent is in the form of a liquid, a gel or a solid in the unactive configuration, the activation temperature of the laminar structure being a temperature which corresponds to the activation energy of a chemical reaction leading to release of at least one gaseous compound from the gas generating agent.

10. The laminar structure according to claim 1, wherein the gas generating agent is in the form of a powder or a granular substance.

11. The laminar structure according to claim 1, wherein the gas generating agent is in the form of a hydrogel.

12. The laminar structure according to claim 1, comprising a plurality of envelopes arranged contiguously to each other.

13. The laminar structure according to claim 1, wherein the first layer comprises a semipermeable material and the second layer comprises a semipermeable material, wherein the first layer is located adjacent the second layer, and wherein the first and second layers are bonded together along at least one bonding portion to form the semipermeable envelope for each said cavity.

14. The laminar structure according to claim 1, wherein the at least one cavity comprises a plurality of subcavities being in gas communication with each other.

15. The laminar structure according to claim 1, comprising a plurality of cavities, each of the cavities being separated from its adjacent cavities via respective bonding portions in the unactive configuration of the gas generating agent, wherein the bonding portions include predetermined breaking portions which are adapted to break when subjected to gas pressure produced in the activated configuration of the gas generating agent.

16. The laminar structure according to claim 1, wherein the at least one cavity has a lateral dimension of 1 mm or more in the unactivated configuration and a thickness dimension of 2 mm or less.

17. The laminar structure according claim 1, wherein the at least one cavity has a relative volume increase between 10 and 2000 from a first volume of the at least one cavity in the unactivated configuration to a second volume of the at least one cavity in the activated configuration.

18. The laminar structure of claim 15, wherein, in the active configuration, adjacent said cavities are in gas communication.

19. The laminar structure of claim 16, wherein the cavity has a lateral dimension of 5 mm or more and thickness dimension of 2 mm or less.

* * * * *